United States Patent [19]
Heffernan et al.

[11] Patent Number: 5,379,419
[45] Date of Patent: Jan. 3, 1995

[54] METHODS AND APPARATUS FOR ACCESSSING NON-RELATIONAL DATA FILES USING RELATIONAL QUERIES

[75] Inventors: John S. Heffernan, Acton, Mass.; Peter L. Savage, Mont Vernon, N.H.; Steven J. Pittman, Arlington, Mass.; Ramu V. Sunkara, Nashua, N.H.

[73] Assignee: Digital Equipment Corporation, Maynard, Mass.

[21] Appl. No.: 623,762

[22] Filed: Dec. 7, 1990

[51] Int. Cl.$^6$ .............................................. G06F 15/40
[52] U.S. Cl. .............................. 395/600; 364/DIG. 1; 364/282.1; 364/282.4; 364/283.4
[58] Field of Search ........................................ 395/600; 364/DIG. 1:DIG. 2

[56] References Cited

U.S. PATENT DOCUMENTS

| | | | |
|---|---|---|---|
| 4,769,772 | 9/1988 | Dwyer | 395/600 |
| 4,829,427 | 5/1989 | Green | 395/600 |
| 4,956,774 | 9/1990 | Shibamiya et al. | 395/600 |
| 5,091,852 | 2/1992 | Tschida et al. | 395/600 |

OTHER PUBLICATIONS

Chung, C., "Design and Implementation of a Heterogeneous Distributed Database Management System," Sep. 1989, 356–362 IEEE.
Gardarin, G. et al, "Extending a Relational DBMS to Support Complex Arguments," IEEE, Aug. 1989, pp. 131–137.
Chung, C. et al, "A Relational Query Language Interface to a Hierarchical DBMS," IEEE, Aug. 1989, pp. 105–112.
Davis, J., "Edict-An Enhanced Relational Data Dictionary, Architecture & Example", IEEE, Feb. 1988, pp. 184–191.
Levy, L., "Generalized Technique for Storage-Independent Date-Accessing Interface" IBM Technical Disclosure Bulletin, vol. 19, No. 11, Apr. 1977, New York, N.Y. US, pp. 4404–4406.
Hanata S., et al, "Conversational Database Query Language" Review of the Electrical Communications Laboratories, vol. 29, No. 1-2, Jan. 1981, pp. 32–50.
M. Ruschitzka, et al, "Sibyl: A Relational Database system with Remote-Access Capabilities" AFIPS 1984 National Computer Conference Jul. 9, 1984, Las Vegas, US pp. 537–545.
Litwin et al., "Multidatabase Interoperability," Computer 10–18 (Sep. 1986).
Smith, J. M. et al., "Multibase-integrating hetergeneous distributed data data systems," National Computer Conference, 1981, pp. 47–199 (1991).
Simonson et al., "Ingres Gateways: Transparent Heterogeneous SQL Access," IEEE Computer Society Technical Committee on Data Engineering, vol. 13, No. 2, pp. 40–45 (Jun. 1990).
Harris P., et al., "The Lotus Data Lens Approach to Hetergeneous Database Connectivity," IEEE Computer Society Technical Committee on Data Engineering, pp. 46–51 (Jun. 1990), vol. 13, No. 2.
Hanson, Michael R., et al., "Integrating Relational Databases and Constraint Languages," Computer Languages, vol. 14, No. 2, pp. 63–82, 1989.

*Primary Examiner*—Paul IV. Kulik
*Assistant Examiner*—John C. Loomis
*Attorney, Agent, or Firm*—Albert P. Cefalo; Dirk Brinkman

[57] ABSTRACT

A relational data access facility allows relation-type queries to access data stored in non-relational data files by converting relational queries into a set of common commands which are sent to data drivers to obtain the data specified by those queries. The facility uses metadata which describes the organization of the data in the non-relational files, and examines the expressions in the relational queries to formulate an access plan for the data. The plan is formulated to reduce cost and promote efficiency.

25 Claims, 38 Drawing Sheets

1200

| RSE ID | NESTING LEVEL | DCT REL ID |
|--------|---------------|------------|
|        |               |            |
|        |               |            |
|        |               |            |
|        |               |            |
|        |               |            |
|        |               |            |
|        |               |            |
|        |               |            |

1210  1220  1230

RSE TABLE

FIG. 12(a)

| 1250 | RSE ID | CVAR | DATA SOURCE | DCT REL ID |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  | 1260 | 1270 | 1280 | 1290 |

RSE ID AND CVAR TABLE

FIG. 12(b)

PREPARING OR BRANCHES
WITH TWO CVARS

| SELECTION CONDITION | SELECTIVITY FACTOR |
|---|---|
| FIELD COLUMN = VALUE | F = 1/10 |
| FIELD COLUMN 1 = FIELD COLUMN 2; HERE THE FIELDS ARE FROM THE SAME RELATION | F = 1/10 |
| FIELD COLUMN 1 = FIELD COLUMN 2; HERE THE FIELDS ARE FROM DIFFERENT RELATIONS. (EQUII JOIN) | F = 1 MAX (SQRT (CARDINALITY OF R1), SQRT (CARDINALITY OF R2)) |
| FIELD COLUMN > VALUE | F = 1/3 |
| FIELD COLUMN < VALUE | F = 1/3 |
| VALUE − 1 < FIELD COLUMN < VALUE − 2 | F = 1/4 |

| DATA OPERATION | COST FORMULA |
|---|---|
| SEQUENTIAL RETRIEVAL OF THE RELATION RECORDS | C = 1/2 (RELATION CARDINALITY + 4) |
| NESTED LOOP JOIN | C = RETRIEVAL_COST (R1) + RETRIEVAL_COST (R2) * RELATION_CARDINALITY (R1) |
| HASH JOIN (EQUII JOIN) | C = RETRIEVAL_COST (R1) + RETRIEVAL_COST (R2) |
| SORT OR PROJECT | C = 10 * LOG 2 (RELATION_CARDINALITY) |

FIG. 19

INPUTS ARRAY 1900

| 1905 — CVAR #1 | CVAR #2 — 1910 |
|---|---|
| 1915 — CARD #1 | CARD #2 — 1920 |
| 1925 — I/O COST PER TUPLE #1 | I/O COST PER TUPLE #2 — 1930 |
| 1940 — NESTED LOOP / HASH ||
| 1950 — JOIN SELECTIVITY ||
| 1960 — OR BRANCH ID IN CNF ||

FIG. 20

OUTPUTS ARRAY 2000

| 2010 — INNER REL CVAR | OUTER REL CVAR — 2020 |
|---|---|
| NESTED LOOP / HASH — 2030 ||
| OR BRANCH ID IN CNF — 2040 ||

| DCT REL ID | CONTEXT VAR | FDV | PTR TO DATA | DBKEY VALUE PTR | NXT ENTRY |
|---|---|---|---|---|---|
| DCT REL ID | CONTEXT VAR | FDV | PTR TO DATA | DBKEY VALUE PTR | NXT ENTRY |
| DCT REL ID | CONTEXT VAR | FDV | PTR TO DATA | DBKEY VALUE PTR | NXT ENTRY |
| DCT REL ID | CONTEXT VAR | FDV | PTR TO DATA | DBKEY VALUE PTR | NXT ENTRY |
| ⋮ | ⋮ | ⋮ | ⋮ | ⋮ | ⋮ |

2300 / 2310 / 2320 / 2330 / 2340 / 2350 / 2360

RECORD DATA VECTOR

FIG. 23

| DCT FIELD ID | FIELD OFFSET | NXT ENTRY |
|---|---|---|
| DCT FIELD ID | FIELD OFFSET | NXT ENTRY |
| DCT FIELD ID | FIELD OFFSET | NXT ENTRY |
| DCT FIELD ID | FIELD OFFSET | NXT ENTRY |
| DCT FIELD ID | FIELD OFFSET | NXT ENTRY |
| DCT FIELD ID | FIELD OFFSET | NXT ENTRY |

2410    2420    2430

2400

FIELD DATA VECTOR

FIG. 24

ACCESS PLAN FOR
SIMPLE OR BRANCH

DELAYED EXECUTION
ACCESS PLAN GENERATION

SELECT college_name, city, state
    FROM coleges c
    WHERE NOT EXISTS ( SELECT d. college_code
                        FROM degrees d
                        WHERE d. college_code =
                            c. college_code )

2900
---

ACCESS PLAN QUEUE:

| 1 | 2 | 3 | 4 | 5 |

1: DRIVER SELECT : RSE #1 : degrees,
2: DRIVER SELECT : RSE #2 : colleges,
3: NOT ANY : RSE #1, RSE #2 :
            d. college_code = c. college_code
4: DELETE RSE : RSE #1
5: DATA OUTPUT : RSE #2 : colleges

FIG. 29

ACCESS PLAN QUEUE:

| 1 | 2 | 3 | 4 | 5 | 6 | 7 | 8 |
|---|---|---|---|---|---|---|---|

3000

1: DRIVER SELECT : employees
2: DRIVER SELECT : salary_history = "salary_end is null"
3: DRIVER SELECT : job_code = "job_code = MANAGER"
4: JOIN : e. employee_id = jc. employee_id
5: JOIN : e. employee_id = sh. employee_id
6: DELETE COLL : job_code,
7: DATA OUTPUT : employee, salary_history

| # | |
|---|---|
| 3201 | DRIVER SELECT HEADER |
| 3202 | RSE ID |
| 3204 | CONTEXT VARIABLE |
| 3206 | PRIMARY COLLECTION |
| 3208 | FUNCTION VECTOR |
| 3210 | RELATION HANDLE |
| 3215 | FIELD NAME LIST |
| 3220 | FIELD LENGTH LIST |
| 3225 | FIELD DATATYPE LIST |
| 3230 | FIELDSCALE LIST |
| 3235 | INPUT FIELD DATA VECTOR |
| 3240 | OUPUT FIELD DATA VECTOR |
| 3245 | INPUT TUPLE LENGTH |
| 3250 | OUPUT TUPLE LENGTH |
| 3255 | DBKEY |
| 3260 | CARDINALITY |
| 3265 | DBKEY SELECTION |
| 3270 | DXR ID |
| 3275 | MESSAGE NUM LIST |
| 3280 | DRIVER SELECT INFORMATION |
| 3285 | DRIVER ACCESS PATH INFO |

DRIVER SELECT SPECIFICATION

FIG. 32

PROJECT ACCESS
PLAN GENERATION

SORT ACCESS
PLAN GENERATION

DCM SELECT SPECIFICATION

3700

```
            ADDRESS_DATA_1 ; 1              FIELD
            BIRTH DATE ; 1                  FIELD
            CDDPROTOCOLS                    DIRECTORY
            CITY ;                          FIELD
            COLLEGE                         CDD$DATABASE
            COLLEGE_CODE ; 1                FIELD
            COLLEGE_NAME ; 1                FIELD
            COLLEGE_RECORD ; 1              RECORD
            COLLEGE_STORAGE ; 1             CDD$RMS_DATABASE
            DATE_REC ; 1                    FIELD
            DEGREES ; 1                     CDD$DATABASE
            DEGREE_FIELD ; 1                FIELD
            DEGREE_RECORD                   RECORD
            DEGREE_STORAGE ; 1              CDD$RMS DATABASE
            DEPARTMENTS ; 1                 CDD$DATABASE
            DEPARTMENT_CODE ; 1             FIELD
            DEPTS_RECORD ; 1                RECORD
            DEPTS_STORAGE ; 1               CDD$RMS_DATABASE
            DEPT_MGR_ID ; 1                 FIELD
3710 ~      DEPT_NAME ; 1                   FIELD
            EMPLOYEES ; 1                   CDD$DATABASE
            EMPLOYEE_ID ; 1                 FIELD
            EMPLOYEE_RECORD ; 1             RECORD
            EMPLOYEE_STORAGE ; 1            CDD$RMS_DATABASE
            FIRST_NAME ; 1                  FIELD
            FOO ; 1                         RECORD
            FT_DICTIONARY                   DIRECTORY
            JOBS ; 1                        CDD$DATABASE
            JOBS_RECORD ; 1                 RECORD
            JOBS_STORAGE ; 1                CDD$RMS_DATABASE
            JOB_CODE ; 1                    FIELD
            JOB_END ; 1                     FIELD
            JOB_HISTORY ; 1                 CDD$DATABASE
            JOB_HISTORY_RECORD ; 1          RECORD
            JOB_HISTORY_STORAGE ; 1         CDD$RMS_DATABASE
            JOB_START ; 1                   FIELD
            JOB_TITLE ; 1                   FIELD
            LAST_NAME ; 1                   FIELD
            LONG_FILLER ; 1                 FIELD
            MAX_SALARY ; 1                  FIELD
            MIDDLE_INITIAL ; 1              FIELD
            MIN_SALARY ; 1                  FIELD
            POSTAL_CODE ; 1                 FIEL
            SALARY_AMOUNT ; 1               CDD$DATABASE
            SALHIST ; 1                     RECORD
            SALHIST_RECORD ; 1              CDD$RMS_DATABASE
            SALHIST_STORAGE ;               FIELD
            SAL_END_DATE ; 1                FIELD
            SAL_START_DATE ; 1              FIELD
            SEX ; 1                         FIELD
            STATE ; 1                       FIELD
            STATUS_CODE ; 1                 FIELD
            SUPERVISOR_ID ; 1               CDD$DATABASE
            S_EMPLOYEES ; 1                 CDD$DATABASE
            TEST ; 1
            WAGE_CLASS ; 1                  FIELD
```

```
         DEFINITION OF RECORD JOB_HISTORY_RECORD
         |   CONTAINS FIELD         EMPLOYEE_ID
         |   CONTAINS FIELD         FILLER23
         |   CONTAINS FIELD         JOB_CODE
         |   CONTAINS FIELD         FILLER24
         |   CONTAINS FIELD         JOB_START
3720 ~   |   CONTAINS FIELD         FILLER25
         |   CONTAINS FIELD         JOB_END
         |   CONTAINS FIELD         FILLER26
         |   CONTAINS FIELD         DEPARTMENT_CODE
         |   CONTAINS FIELD         FILLER27
         |   CONTAINS FIELD         SUPERVISOR_ID
```

```
         DEFINITION OF FIELD EMPLOYEE_ID
         |   DATATYPE         TEXT SIZE IS 5 CHARACTERS
         CDO>
         CDO> SHOW DATABASE / FULL SALHIST
         DEFINITION OF DATABASE SALHIST
         |   DATABASE USES RMS DATABASE SALHIST_STORAGE
         |   |   DATABASE USES RECORD SALHIST_RECORD
         |   |   |   CONTAINS FIELD           EMPLOYEE_ID
         |   |   |   |   DATATYPE                 TEXT SIZE IS 5 CHARACTERS
         |   |   |   CONTAINS FIELD           FILLERC20
         |   |   |   |   BASED ON                 FILLER
         |   |   |   |   |   DATATYPE                 TEXT SIZE IS 3 CHARACTERS
         |   |   |   CONTAINS FIELD           SALARY_AMOUNT
         |   |   |   |   DATATYPE                 TEXT SIZE IS 5 CHARACTERS
         |   |   |   CONTAINS FIELD           FILLERC21
3730 ~   |   |   |   |   BASED ON                 FILLER
         |   |   |   |   |   DATATYPE                 TEXT SIZE IS 3 CHARACTERS
         |   |   |   CONTAINS FIELD           SAL_START_DATE
         |   |   |   |   DATATYPE                 TEXT SIZE IS 23 CHARACTERS
         |   |   |   CONTAINS FIELD           FILLERC22
         |   |   |   |   BASED ON                 FILLER
         |   |   |   |   |   DATATYPE                 TEXT SIZE IS 3 CHARACTERS
         |   |   |   CONTAINS FIELD           SAL_END_DATE
         |   |   |   |   DATATYPE                 TEXT SIZE IS 23 CHARACTERS
         |   |   |   FILE DEFINITION
         |   |   |   |   FILE ORGANIZATION SEQUENTIAL
         |   |   |   |   FILE RECORD FORMAT VARIABLE
         |   |   DATABASE IN FILE DAF$DATABASE : SQL$$SALHIST . DAT
         |   |   |   FULLY QUALIFIED FILE $PROJ5 : [ DAF.CODE.DATABASE] SQL$$SALHIST.DAT ;
```

| FUNCTION | ADDRESS |
|---|---|
| ATTACH DICTIONARY | 0000 005F |
| DETACH DICTIONARY | 0000 008F |
| FETCH DICTIONARY FIELDS | 0000 00BF |
| FETCH DICTIONARY RELATIONS | 0000 00EF |
| FETCH VIEW FIELDS | 0000 032F |
| FETCH VIEW RELATIONS | 0000 035F |

DICTIONARY DRIVER
INTERFACE FUNCTION

FIG. 39

| 4000 | FUNCTION | ADDRESS |
|---|---|---|
| | ALLOCATE METADATA MEMORY | 0000 1FFF |
| | CLOSE DATA RELATION | 0000 202F |
| | COMMIT TRANSACTION | 0000 205F |
| | ⋮ | ⋮ |
| | SHOW RELATION INFORMATION | 0000 238F |
| | START TRANSACTION | 0000 23BF |

DATA DRIVER INTERFACE
FUNCTION VECTOR

METHODS AND APPARATUS FOR ACCESSSING NON-RELATIONAL DATA FILES USING RELATIONAL QUERIES

BACKGROUND OF THE INVENTION

The present invention relates generally to the field of accessing non-relational data files, and more specifically to the accessing of such non-relational data files using relational-type queries.

Relational databases have gained a great deal of popularity as a means of representing data because relational databases allow easy and flexible access to the data they contain. Relational databases are perceived by users as being organized into tables. As such, they permit the retrieval of information in many different ways.

Relational database management systems have been developed to support relational databases. Relational query languages are used to control relational database management systems and to provide users with mechanisms for modifying or accessing data in the databases. Relational query languages usually provide for data manipulation operations such as retrieval, modification, deletion, and insertion into a database. One common relational query language is called the SQL or structured query language.

In addition to relational databases, several different types of non-relational data files are currently in use, many of which were developed before the advent of relational databases. Non-relational data files are considered to be just a series of records without structure, although they may include an index. Data is retrieved from a non-relational data file by specifying the record or by using the index. Non-relational data files generally do not allow flexible data access by means of tables.

Because of the power and flexibility of relational databases and the query languages that have been designed to support those databases, there is a general desire on the part of many users to transport the data that is currently in a non-relational data file into a relational database. Physical transportation of the data is very costly, however, and can sometimes be very difficult for large or complex data files. In addition, there is always the possibility of error.

Another approach has been to translate relational-type queries such as SQL commands, into a series of commands understandable by the different non-relational data files. This technique, which has been referred to as a "gateway," requires a separate interface for each different database. Although gateways have been used, they suffer from certain disadvantages. One is that a new gateway must be created for each different non-relational data file. In addition, the time and energy of skilled programmers is required to build gateways, which can add a great deal of cost to any system.

It would therefore be desirable to create a system which provided an access to non-relational data files via relational queries which also allowed additional databases and additional sources of the queries to be added without a great deal of reprogramming.

Another desirable feature would be to provide such access using a mechanism which optimizes the data accesses to the non relational data files to reduce the cost of such access and to promote efficiency.

It would also be desirable to construct such a system which took advantage of capabilities built into drivers for non-relational data files.

II. SUMMARY OF THE INVENTION

In order to achieve the desires indicated above, this invention provides relational data access to data stored in non-relational data files by converting relational queries into a set of common commands which are sent to data drivers to obtain the data specified by those queries. In accomplishing this, the system accesses sources of metadata which describe the organization of the data in the non-relational files.

In addition, the system can also examine the record selection expressions in the relational queries to formulate a plan for accessing the non-relational data files to reduce cost and promote efficiency. An additional feature of this invention is its ability to adapt to different data drivers which provide an interface to the non-relational data files.

More specifically, a system of this invention for providing relational data access to data stored in non-relational data files in response to relational-type queries comprises dictionary means for storing metadata corresponding to each of the non-relational data files; data engine means for decoding the relational-type queries into a set of common data file commands; and database driver means, coupled to the dictionary means and data engine means, for accessing the data in the non-relational data files specified by each of the data retrieval commands received from the data engine means.

III. BRIEF DESCRIPTION OF THE DRAWINGS

The accompanying drawings, which are incorporated in and constitute a part of this specification, illustrate implementations of the invention and, together with the description, serve to explain the objects, advantages, desires, and principles of the invention.

FIG. 12(a) shows an example of an RSE table built by a Query Optimizer Tree Builder in the preferred implementation of this invention.

FIG. 12(b) is an example of an RSE ID and CVAR table built by the Query Optimizer Access Plan Generator in the preferred implementation of this invention.

FIG. 17 shows a table of preferred selectivity factors used in the preferred implementation to estimate cardinality of relations.

FIG. 18 is a table showing a list of preferred cost formulas used in the preferred implementation of this invention.

FIG. 19 shows a preferred form of an inputs array for the join optimizer.

FIG. 20 shows a preferred form for the outputs array for the join optimizer.

FIG. 23 shows an example of a record data vector used in the preferred implementation of this invention.

FIG. 24 shows an example of a field data vector used in a preferred implementation of this invention.

FIG. 29 shows an example of an Access Plan queue.

FIG. 30 shows another example of an Access Plan queue.

FIG. 32 is an example of an DRIVER SELECT specification block.

FIG. 37 shows displays of metadata in a preferred implementation of a dictionary.

FIG. 39 is an example of a function vector for a dictionary driver.

FIG. 40 is an example of a function vector for a data driver.

DETAILED DESCRIPTION OF PREFERRED IMPLEMENTATIONS

Reference will now be made in detail to the construction and operation of a preferred implementation of the present invention which are illustrated in the accompanying drawings. In those drawings, like elements and operations are designated with the same reference numbers.

The following description of the preferred implementation of the present invention is only exemplary of the invention. The present invention is not limited to this implementation, but may be realized by other implementations.

A. SYSTEM OPERATION

Figure 1:
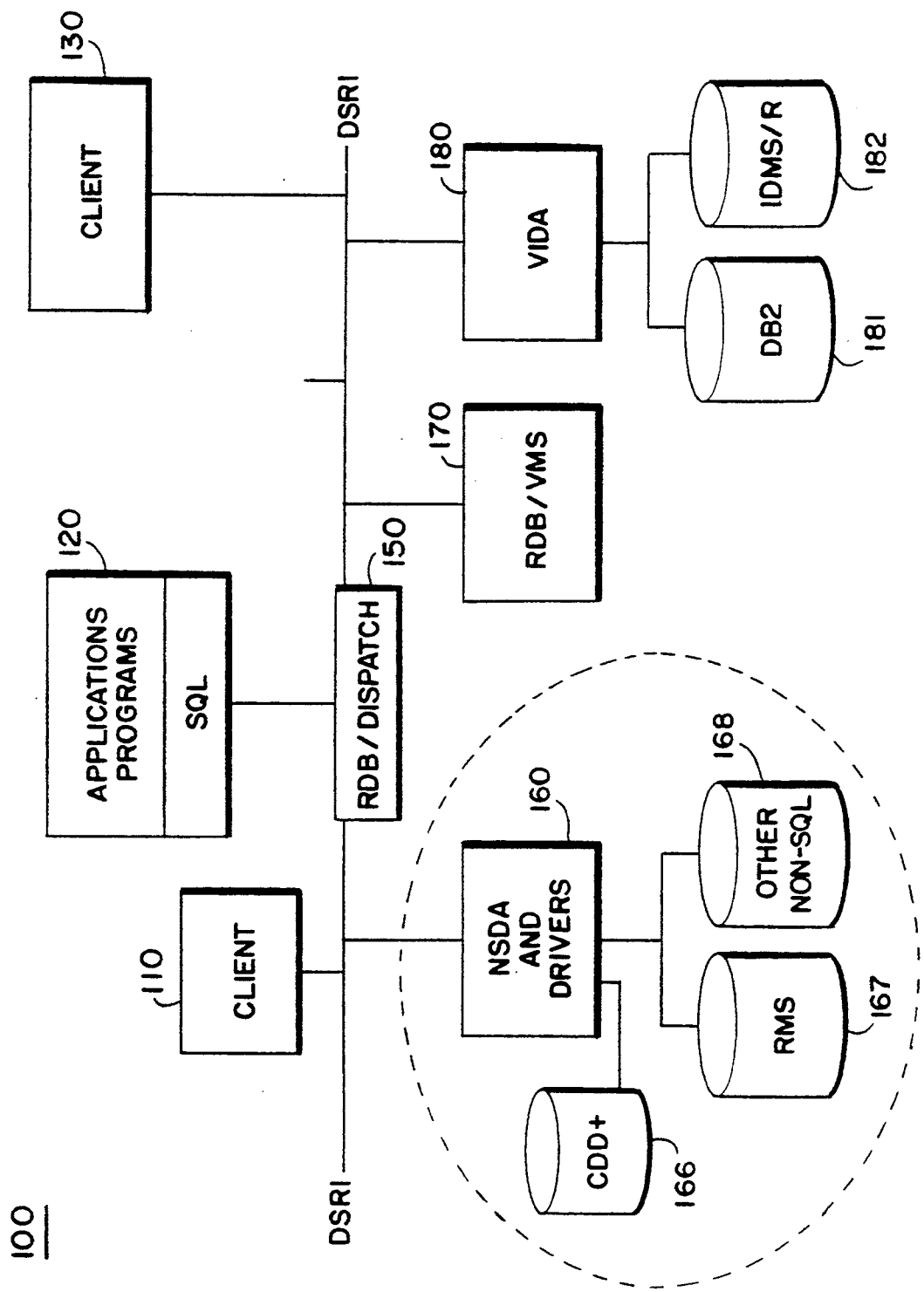
FIG. 1 is a block diagram of the computer network which contains a preferred embodiment of the relational data access facility of this invention.

FIG. 1 shows an overview of a computer network 100 containing a relational data access facility in accordance with the present invention. System 100 includes several clients, 110, 120, and 130, each of which can generate relational queries. For purposes of the following description, such queries will be SQL queries. The present invention, however, is not limited only to use of SQL queries.

The SQL queries are generated using the DSRI format in the preferred embodiment. The DSRI (Digital Standard Relational Interface) format is an architecture defining how local and remote programs can communicate with relational database management systems. The details of this interface can be found in Digital Database Architecture Specifications which is available from the assignee of this invention, Digital Equipment Corporation.

An important concept in a DSRI request is the use of an RSE or record select expression. The RSE refers to a word or group of contiguous words in a data manipulation language, such as SQL, that specifies a selection criteria to be used by a database control system to identify specific database records. The RSE not only describes the data to be retrieved, but also the order in which the data must be returned to the requestor.

In FIG. 1, all of the sources of relational queries from clients 110, 120, and 130 are received by a dispatcher 150. Dispatcher 150 is preferably an Rdb/Dispatch product provided by Digital Equipment Corporation. Dispatcher 150 examines the queries and routes them to the appropriate destinations. The destinations can either be the relational data access facility 160 or other relational database products. Examples of other relational database products are Rdb/VMS product 170 made available by Digital Equipment Corporation, and the VIDA product 180 with databases 181 and 182. The VIDA product is also made available by Digital Equipment Corporation.

Relational data access facility 160 includes a Non-SQL Data Server (NSDS), drivers which couple to dictionaries, such as dictionary 166, and drivers which couple to non-relational data files such as RMS file 167 or file 168. RMS is a file system suppled by Digital Equipment Corporation for use in with its VMS operating system.

Figure 2:
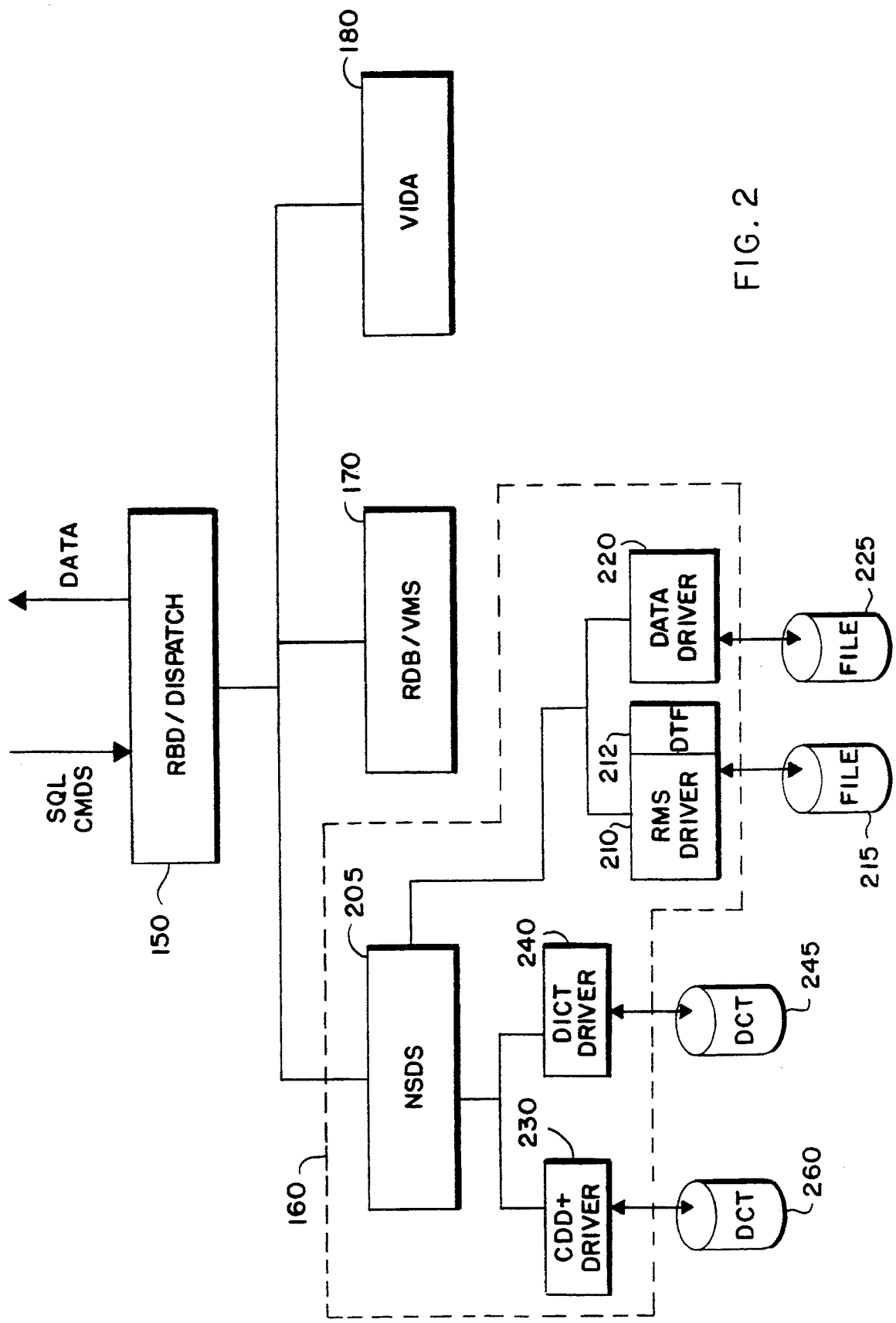
FIG. 2 shows the relational data access facility of FIG. 1 in greater detail.

FIG. 2 shows Rdb/Dispatch 150, as well as the destinations of the SQL queries, in greater detail. In FIG. 2, Rdb/Dispatch 150 is shown as routing SQL queries either to relational data access facility 160, to Rdb/VMS product 170, or to VIDA product 180. Rdb/Dispatch 150 provides a transparent interface between the host application programs and database facilities. It also allows access of data on remote nodes. When SQL commands are issued, either individually or as part of an applications program, that instruction implicitly invokes Rdb/Dispatch 150. Rdb/Dispatch 150 selects the database facility to be used based upon a qualifier in a DECLARE SCHEMA statement which was previously sent to Rdb/Dispatch 150 to connect database facilities.

Relational data access facility 160 includes NSDS 205, RMS data driver 210, foreign data driver 220, CDD/Plus dictionary driver 230, and foreign dictionary driver 240. NSDS 205 is a data access engine which provides relational data capabilities for non-relational files. Non-relational data file drivers 210 and 220 provide an interface between non-relational files and NSDS 205. Dictionary drivers 230 and 240 provide an interface between NSDS 205 and the metadata dictionaries 245 and 260 which define the non-relational data.

RMS driver 210 is coupled to RMS files 215. RMS driver 210 can work in conjunction with a Data Transfer Facility ("DTF") driver 212 which can be coupled to VSAM files, which are non-relational data files maintained by a product supplied by International Business Machines, Corp. Foreign data driver 220 is coupled to another non-relational data file 225.

Relational databases can be accessed by relations, fields, and views. A field generally refers to the basic unit of data which can be accessed. A relation is a composition of fields. A relation can also be thought of as a table, which is how it appears to the user of a relational database. A view is a composition of relations. Views do not generally exist as tables in a database, but they are visible to the user as a table and act as a type of virtual table. Thus, a view is a table that can be derived in some manner from actual tables.

Figure 3:
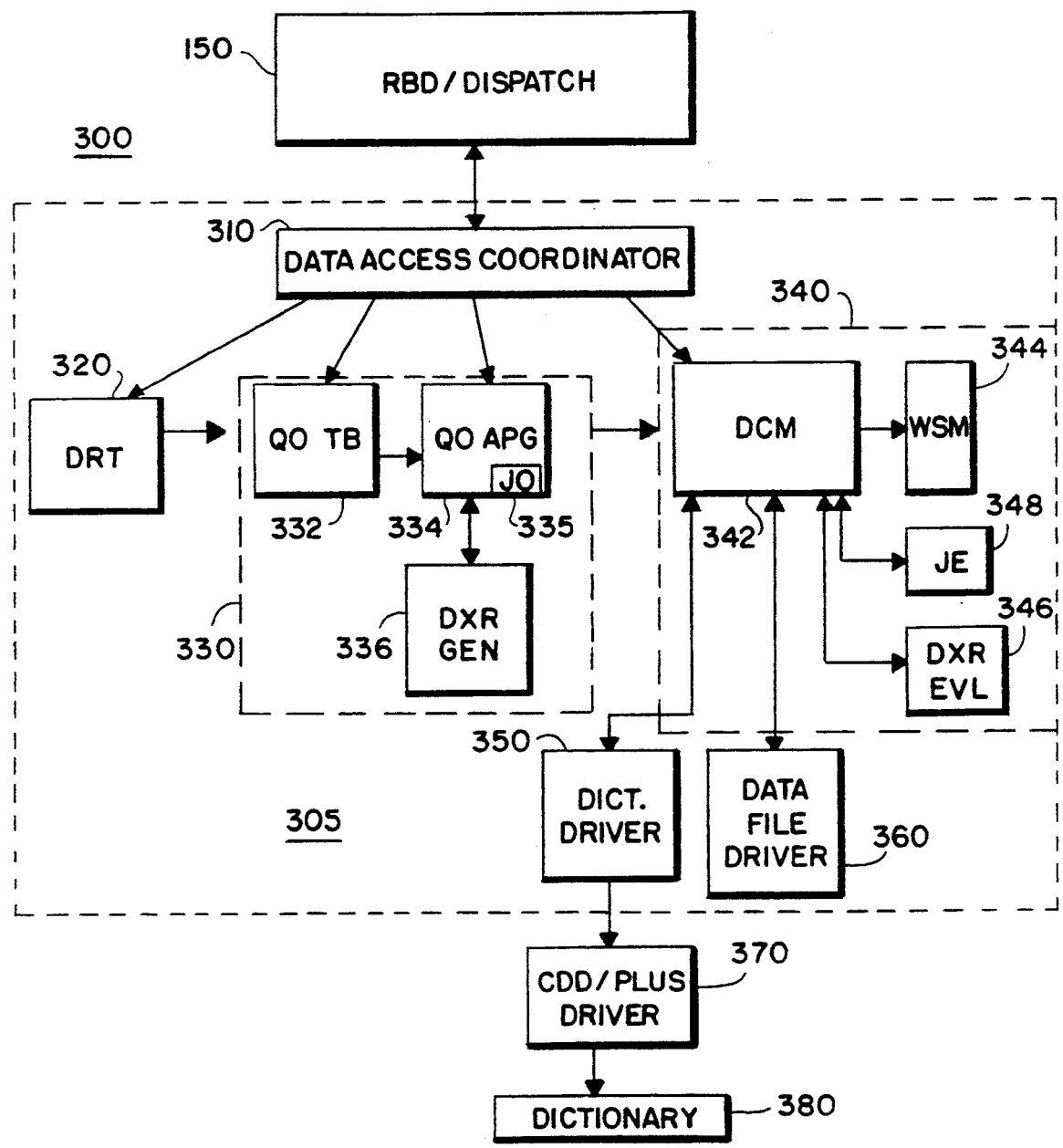
FIG. 3 is a detailed block diagram of the elements in the preferred implementation of the relational data access facility of this invention.

The access of the non-relational files by relational data access facility 160 is done by relations. Relational data access facility 160 can access data from multiple disparate sources. Presently, the preferred implementation of the data access facility does not support data having an undefined record format, although other implementations can support such data. FIG. 3 is a more detailed description of the components of the preferred implementation of the relational data access facility of this invention. In FIG. 3, relational data access facility 300 includes NSDS 305, a dictionary driver 350, and a data driver 360. NSDS 305 includes a data access coordinator (DAC) 310, a data parser and tree generator (DRT) 320, a query optimizer (QO) 330, and a request processing system 340. Query optimizer 330 includes a query optimizer tree builder (QO TB) 332, a query optimizer access plan generator (QO APG) 334, and an expression generator (DXR GEN) 336. QO APG includes a join optimizer (JO) 335. Request processing system 340 includes a data collection manager (DCM) 342, a work space manager (WSM) 344, an expression evaluator (DXR EVL) 346, and a join evaluator (JE) 348.

Dictionary driver 350 preferably connects to a dictionary 380 via a CDD/Plus driver 370. Data driver 360 would connect to a non-relational data file which is not shown in FIG. 3.

NSDS 305 emulates relational databases and their organization into fields, relations, and views. NSDS 305 thus makes non-relational data files appear to the clients submitting relational queries as a single image of a relational database. To understand the detailed elements of NSDS 305, a description will first be provided for the general functioning of relational data access facility 300. A more detailed understanding of the precise operation of relational data access facility 300 will then become apparent from a description of the preferred implementation of that facility.

Figure 4:
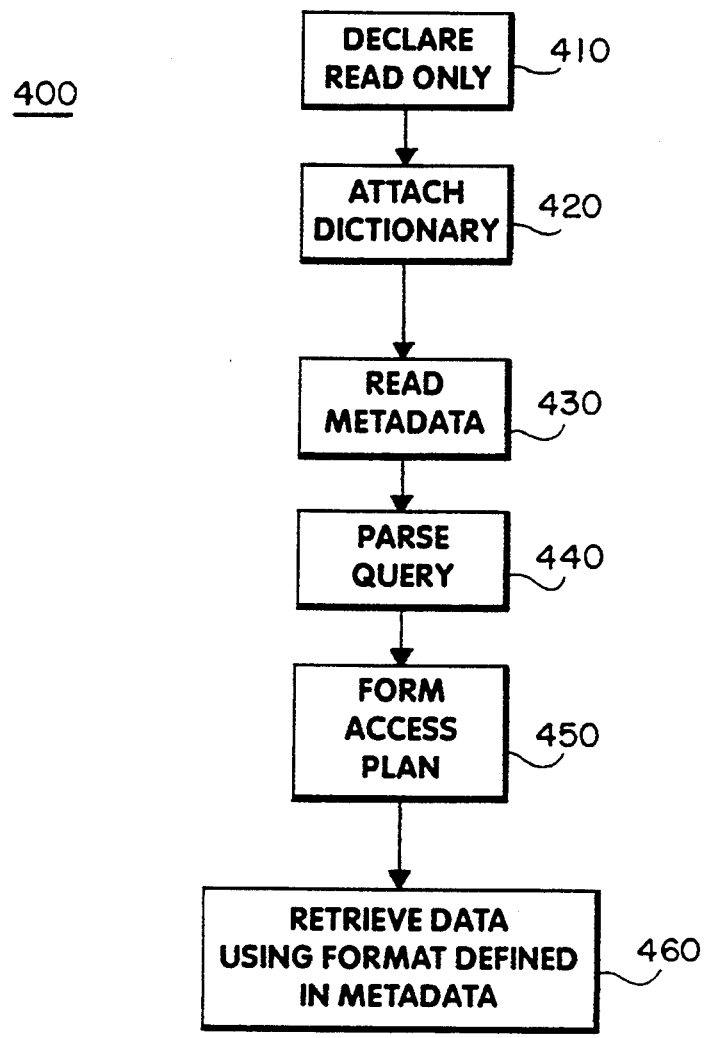
FIG. 4 is a flow chart showing the major activities taking place during the use of the preferred implementation of the relational data access facility of this invention.

FIG. 4 shows a flowchart 400 of the major activities which take place during the use of the relational data access facility 300. In the preferred implementation, relational data access facility 300 only supports read transactions. Consequently, the first SQL statement that should be executed must declare an explicit READ ONLY transaction (step 410). This can be done by using either the DECLARE TRANSACTION READ ONLY or SET TRANSACTION READ ONLY statements.

Next, the appropriate dictionaries must be attached (step 420). This is preferably done by DECLARE SCHEMA statements.

Once the dictionaries are attached, the metadata can be viewed if desired (step 430). In the preferred implementation, a SHOW command can be used to show the data.

A user may now input a number of SQL commands to query the data. Each query is then passed and placed into a tree structure to aid in later analysis (step 440). Examples of the commands and queries supported in the preferred implementation are discussed below.

NSDS 305 (FIG. 3) examines the queries in the tree to form an Access Plan to indicate an optimum manner of retrieving the data (Step 450). In formulating the Access Plan, NSDS 305, through QO 330, determines an optimal access sequence based on, for example, I/O and CPU costs and features of the query elements.

After the Access Plan is formulated, NSDS 305 goes to the appropriate data driver to retrieve the desired information (Step 460). The retrieval makes use of metadata obtained from a corresponding dictionary.

B. NSDS ELEMENTS

1. Data Access Coordinator (DAC)

DAC 310 provides several interfaces and controlling functions for relational data access facility 300. As the interface to Rdb/Dispatch 150, DAC 310 provides an entry point into relational data access facility 300.

DAC 310 also is the main controller for relational data access facility 300. It evaluates commands, dispatches data to the appropriate element of relational data access facility 300, and coordinates the timing and operation of the different elements.

One of the key functions of DAC 310 is to request information from Rdb/Dispatch 150 and the other NSDS 305 elements. That information may include RSEs which specify the records from base relations to be retrieved by relational data access facility 300. The records are presented to the sources of the relational-type queries. RSEs can specify complex sets of Boolean and value expressions to be evaluated on the data tuples. In this description of the invention, tuples refer to rows in relations.

RSEs can be simple or nested. Simple RSEs consist only of relational operations such as SELECT, PROJECT, JOIN, or SORT on the base relations. Nested RSEs are RSEs that contain other RSEs. These can result, for example, from SQL column-select expressions. In a nested RSE, each of the RSEs individually results in relational operations on the base relations. The data tuples from inner RSEs are used to evaluate the outer RSEs, and this order continues until the entire nested RSE is complete.

There are generally two types of nested RSEs. One type, the correlated nested RSE, has a Boolean expression in an inner RSE which refers to data from an outer RSE. In a correlated nested RSE, the data from the inner RSE cannot be evaluated completely. The evaluation of the data tuples in the outer RSE and the inner RSE are correlated.

The other type of nested RSE, an uncorrelated nested RSE, the Boolean expression in the inner RSE does not refer to the data from the outer RSE. In an uncorrelated nested RSE, data tuples from the inner RSE can be completely evaluated and stored as a temporary relation.

2. DATA PARSER AND TREE GENERATOR (DRT)

DRT 320 obtains the binary language representation of each RSE from the Rdb/Dispatch 150 via DAC 310. DRT 320 then parses the binary language representation, verifies the syntax of the RSE, and stores the RSE in an internal tree format. The binary language representation is the first layer of protocol in the DSRI. It is a procedural language that stores BLRs (binary language requests) in a densely-packed binary format.

Figure 5:
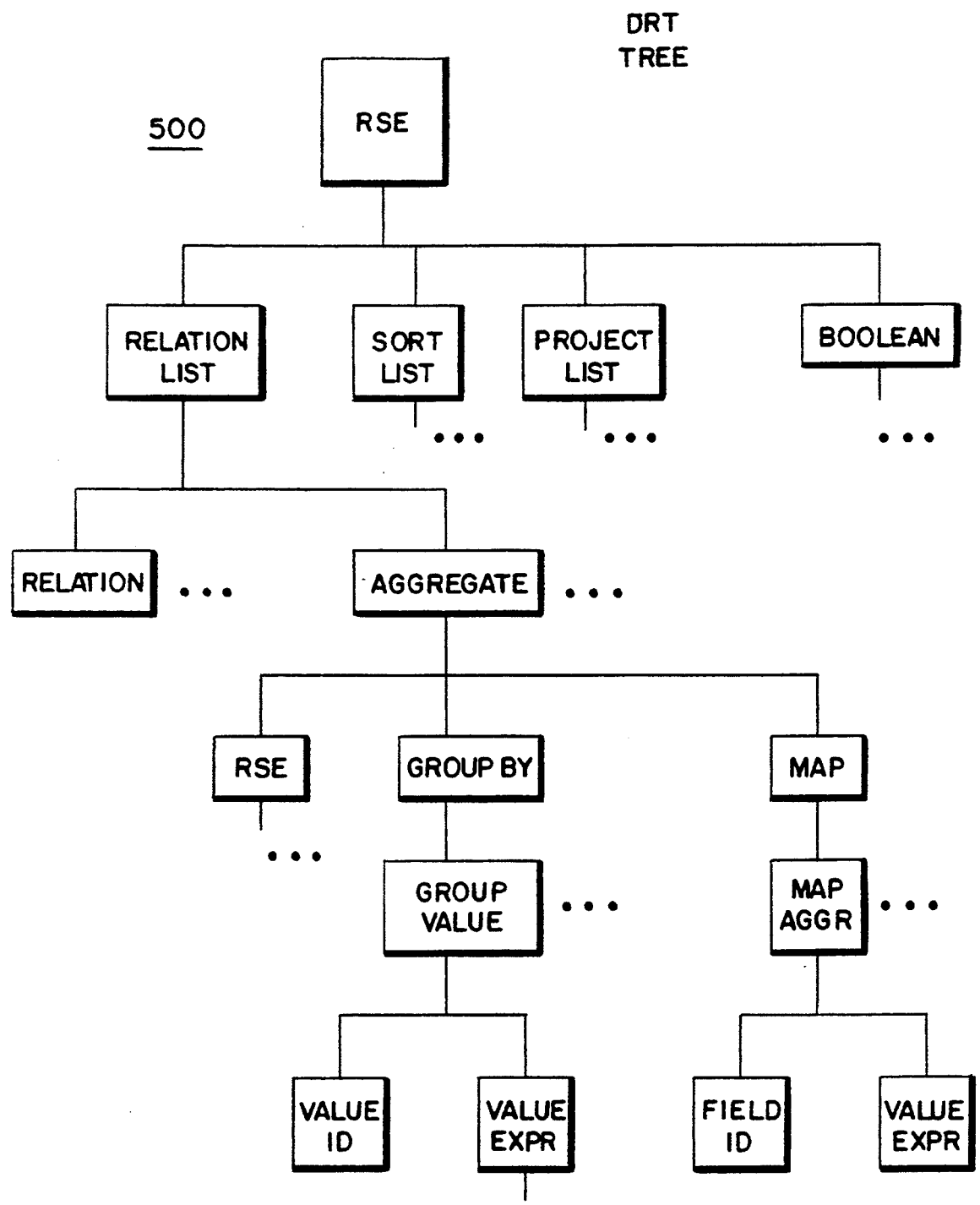
FIG. 5 is an example of an internal tree constructed by a data parser and tree generator in the preferred implementation of the relational data access facility of this invention.

FIG. 5 shows an example of an internal tree 500. In the internal tree, each of the nodes is a separate RSE.

3. QUERY OPTIMIZER ("QO")

As explained above, QO 330 has three elements, QO TB 332, QO APG 334, and DXR GEN 336.

a. QO TB

QO TB 332 accesses the information in the internal tree built by DRT 320 and constructs a temporary QO RSE tree which is used while the Access Plan is being generated for nested RSEs. The QO RSE tree built by QO TB 332 is a working data structure used by QO APG 334.

The QO RSE tree is in conjunctive normal form (CNF) for the Boolean expression parts of each RSE. In the conjunctive normal form, the root represents a Boolean AND expression in each of the children of that root represent Boolean OR expressions.

The QO RSE tree captures the relationship between the RSEs in each DSRI request. The QO RSE tree also classifies each OR BRANCH in the CNF trees. The SORT, PROJECT, GROUP BY, or MAP operations on the RSEs are also children in the trees. Furthermore, the QO RSE tree captures any other information needed to generate the Access Plan, such as context variables. Context variables are variables in an RSE which identify relations.

All nested RSEs are stored in a temporary m-way DRT tree by DRT 320. QO TB 332 constructs a nested RSE tree from the m-way tree, extracting the information needed for the Access Plan.

Figure 6A:
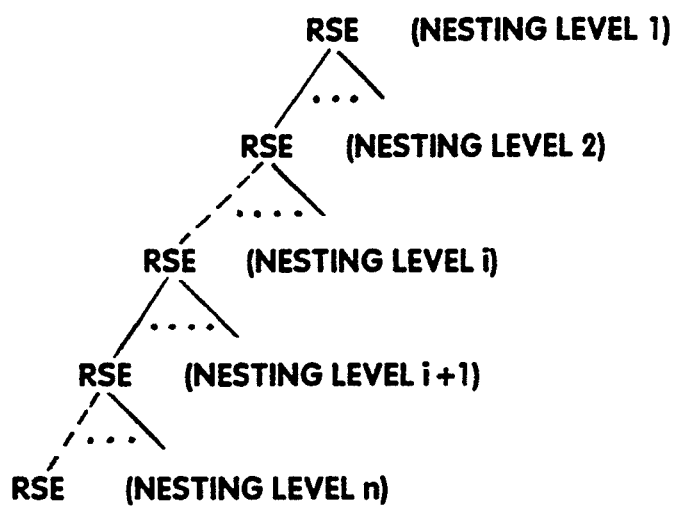
FIG. 6(a) is a diagram an RSE tree.

The RSEs in the RSE tree are classified according to the nesting levels. FIG. 6(a) shows an RSE tree 600 with n levels of nesting. Nesting levels refer to the order of the RSEs in DSRI requests. A given DSRI request can include several RSEs nested inside one another.

Figure 6B:
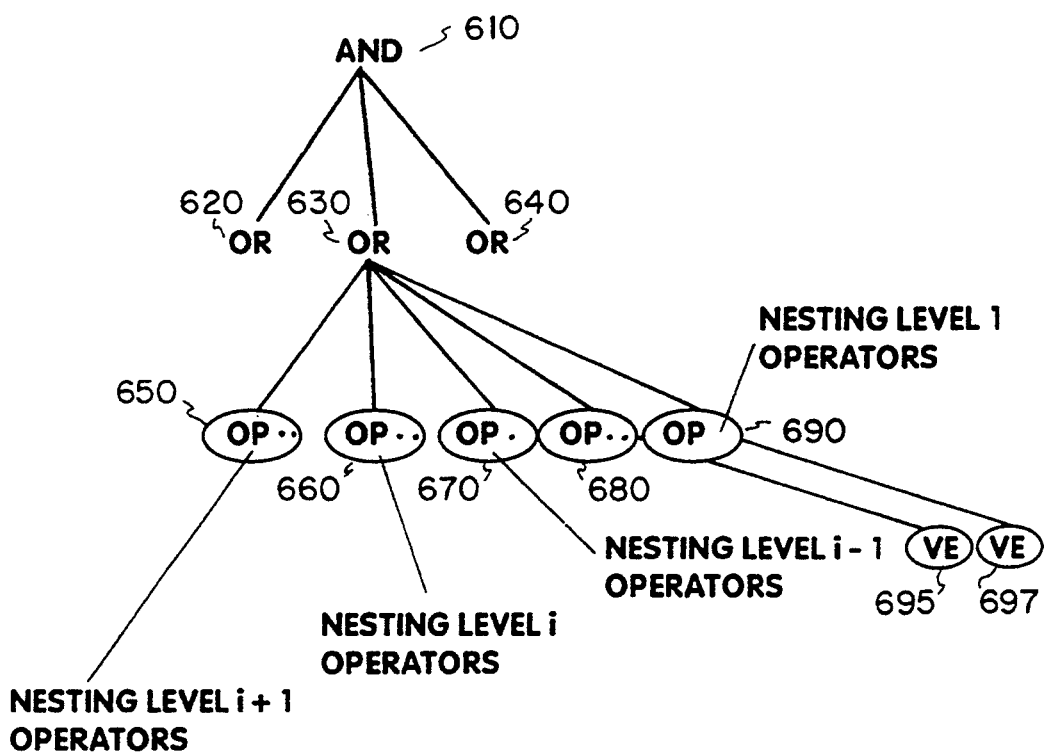
FIG. 6(b) is a diagram of a CNF tree for an RSE.

For each RSE in the QO RSE tree, there is normally a Boolean expression to be evaluated on the data tuples from that RSE. The Boolean expression is transformed by QO TB 332 into a CNF tree. The CNF trees are nodes of the QO RSE tree. An example of a CNF tree for an RSE is CNF tree 650 in FIG. 6(b).

The CNF trees can have up to four levels. The topmost level in a CNF tree is an AND BRANCH shown as branch 610 in FIG. 6(b). The next level in the CNF tree is the OR level. There can be one or more OR BRANCHES, such as branches 620, 630, and 640 in FIG. 6(b), for each AND BRANCH.

The third level in the tree contains OP (operator) BRANCHES nodes. There can be one or more OP BRANCHES for each OR BRANCH. For example in FIG. 6(b), OR BRANCH 630 has OPERATOR BRANCHES 650, 660, 670, 680 AND 690. Operators are used for data comparisons. Examples of operators are relational operators, such as GREATER THAN, LESS THAN, or EQUAL TO, string comparisons, such as CONTAINS or MATCHES, and nesting operators, such as ANY, NOT ANY, UNIQUE, or NOT UNIQUE.

The fourth level is the Value Expression level. This level includes a list of the value expressions, such as expressions 695 and 697 that are compared with the operators in the third level of the tree. There are usually two value expressions for each operator, but there could be three value expressions for string comparisons. In the preferred embodiment, these value expressions include VIA, FROM, and STATISTICAL VALUE.

Each of the operators in the CNF tree is in turn classified into a nesting level based on the value expressions required to evaluate the operation. These are different levels from those in the CNF trees. For example, operators at nesting level i+1 are limited to ANY, NOT ANY, UNIQUE, NOT UNIQUE, VIA, FROM, and STATISTICAL VALUE. These operators are evaluated using data from the inner RSE data collection that is below the current RSE in the RSE tree.

The nesting level i operators can be evaluated with data from the current RSE data collections. The nesting level i−1 through nesting level 1 operators can be evaluated with the data from the RSE collections above the current RSE nesting level in the tree. This situation is called a data dependency.

For nested RSEs, the entire Boolean expression in an RSE at any level in the tree cannot be completely evaluated using data tuples from the RSE. For example, if there are no level i+1 operators in the tree shown in FIG. 6(b), only the level i nesting operators can be evaluated. The other operators must be evaluated with data from RSEs at higher levels in the tree.

Nesting levels are used to classify OR BRANCHES in a CNF tree. In the preferred embodiment, there are four kinds of OR BRANCHES in a CNF RSE tree.

Figure 7:
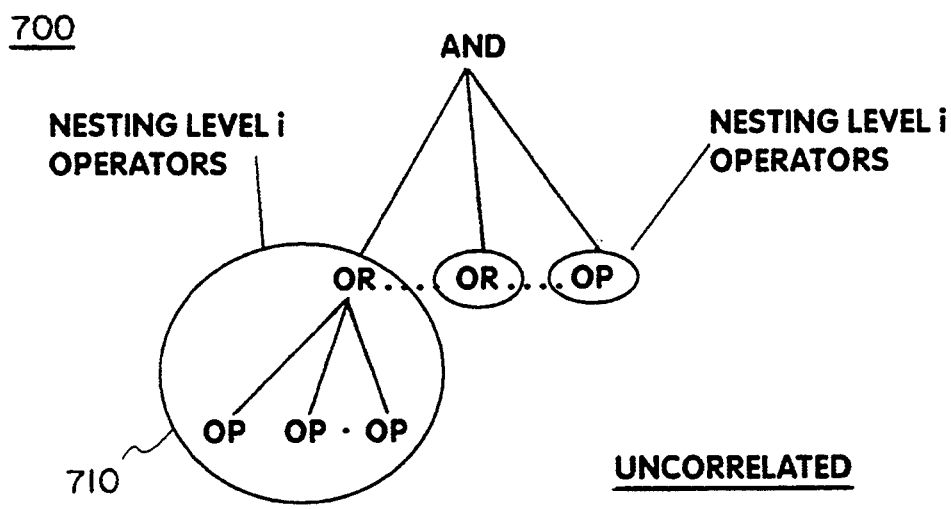
FIG. 7 is a diagram of an UNCORRELATED OR BRANCH.

One kind of OR BRANCH is an UNCORRELATED OR BRANCH 710 of tree 700 shown in FIG. 7. In an UNCORRELATED OR BRANCH, all of the operators are at the same nesting level so the entire Boolean expression in the OR BRANCH is based on data tuples from the current RSE data relations.

Figure 8:
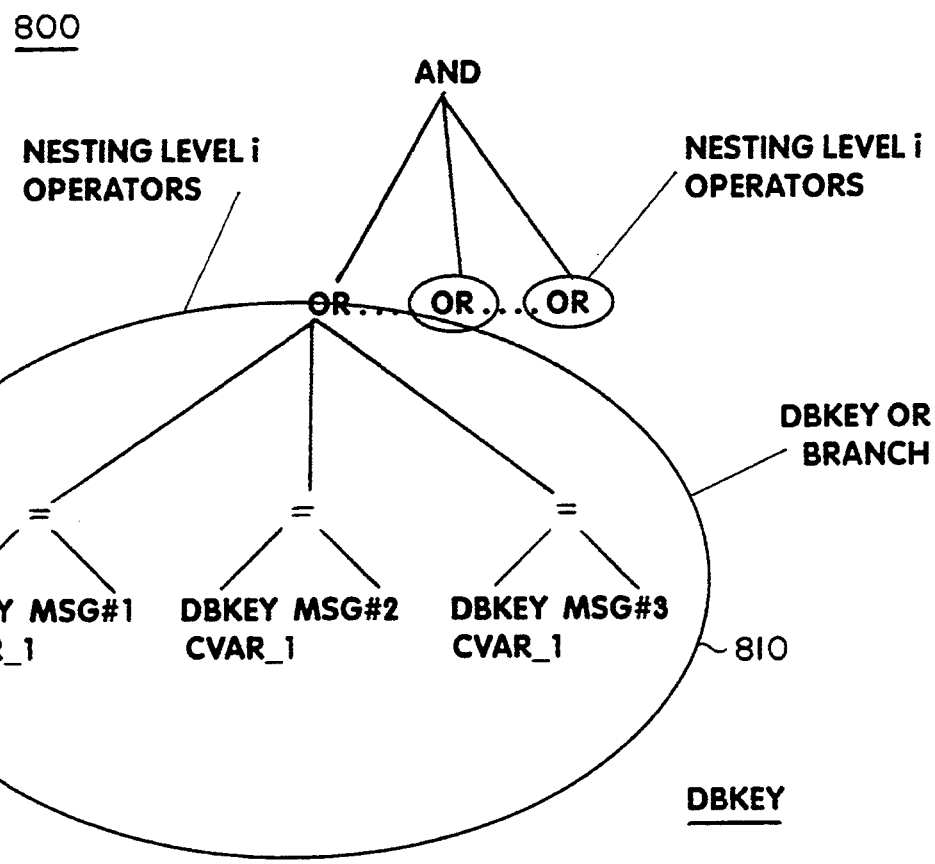
FIG. 8 is a diagram of DBKEY OR BRANCH.

A second kind of OR BRANCH, DBKEY OR BRANCH 810 of tree 800, is shown in FIG. 8. This type of OR BRANCH, which can be considered as a special kind of UNCORRELATED OR BRANCH, contains only DBKEY expressions. DBKEY expressions include data base keys which are keys having values assigned by a data base control system to identify a record uniquely within the data base. Data base keys are used to provide accelerated access to data. In the DBKEY OR BRANCH, all data base key expressions refer to one and only one context variable.

Figure 9:
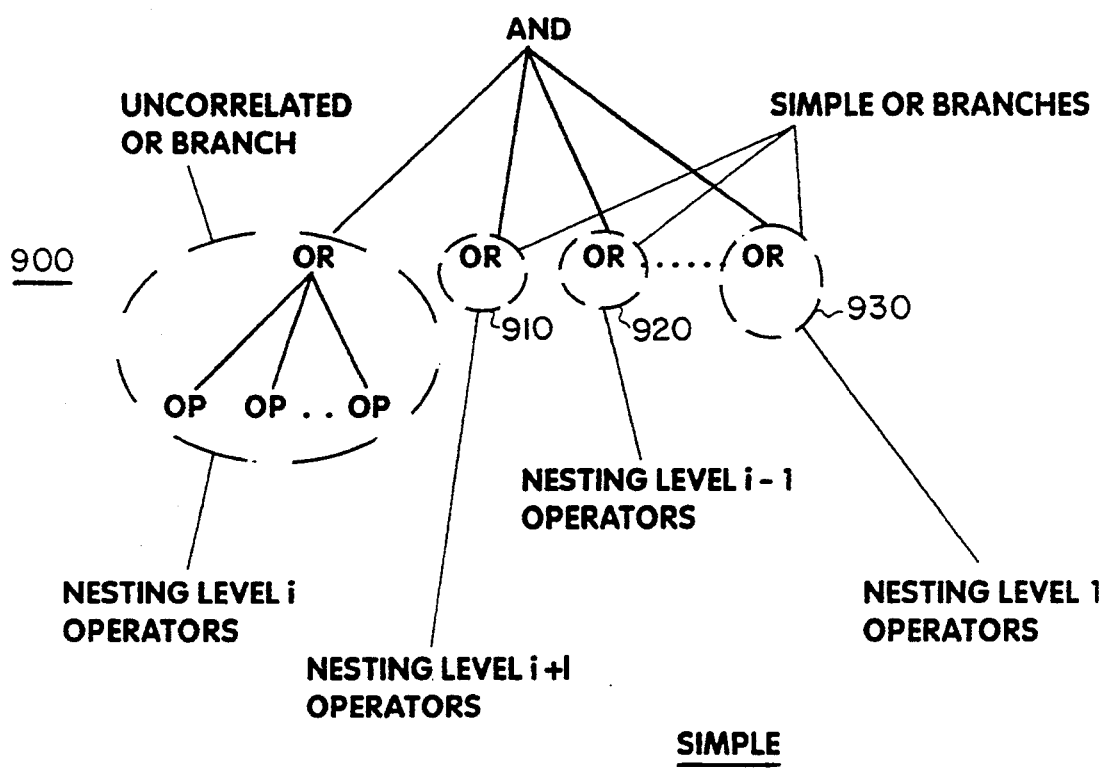
FIG. 9 is a diagram of SIMPLE OR BRANCH.

The third type of OR BRANCH is called a SIMPLE OR BRANCH, examples of which are branches 910, 920 and 930 of tree 900 in FIG. 9. In the SIMPLE OR BRANCHES, all of the operators of the same nesting level are under an OR BRANCH in the tree. In such a case, the entire Boolean tree can be cleanly partitioned for evaluation under the AND node in the tree, and each OR BRANCH refers to data tuples from only two adjacent RSEs. Thus each OR BRANCH can be considered in its entirety independent of other OR BRANCHES. In FIG. 9, tree 900 may be partitioned such that each OR BRANCH can be evaluated by using data from the RSE at level i and RSEs at the immediate higher or lower levels in the RSE tree.

Figure 10A:
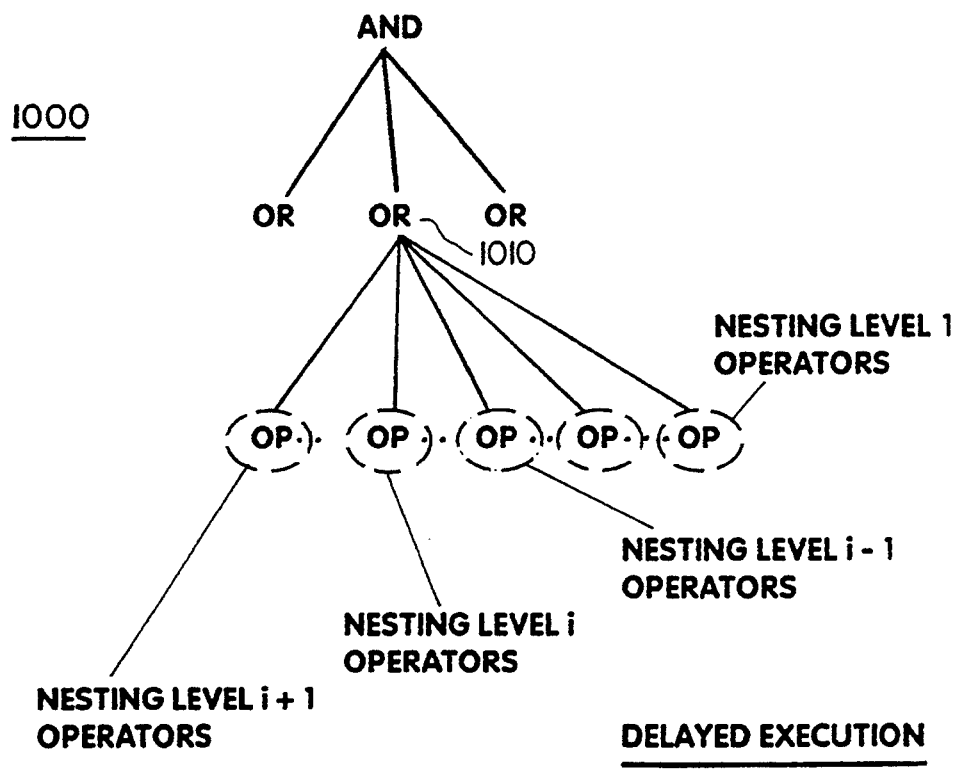
FIG. 10(a) is a diagram of DELAYED EXECUTION OR BRANCH.
Figure 10B:
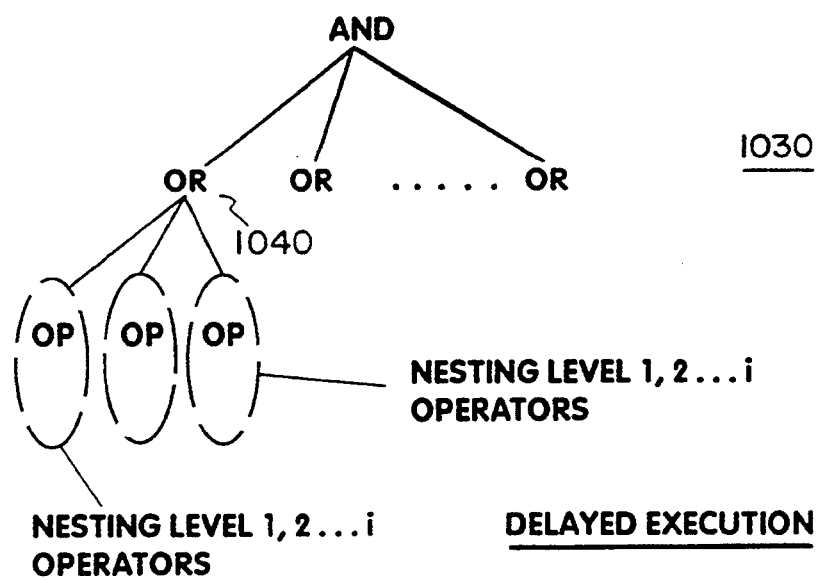
FIG. 10(b) is another diagram of a DELAYED EXECUTION OR BRANCH.

The fourth kind of OR BRANCH is the DELAYED EXECUTION OR BRANCH. Examples of a DELAYED EXECUTION OR BRANCH are OR BRANCH 1010 of tree 1000 in FIG. 10(a) and OR BRANCH 1040 of tree 1030 in FIG. 10(b). If an OR BRANCH cannot be classified into one of the other four kinds, then it is termed a DELAYED EXECUTION OR BRANCH. These OR BRANCHES are very difficult to evaluate because they cannot be partitioned at the operator level because each operator refers to tuples for more than two RSEs.

Figure 11:
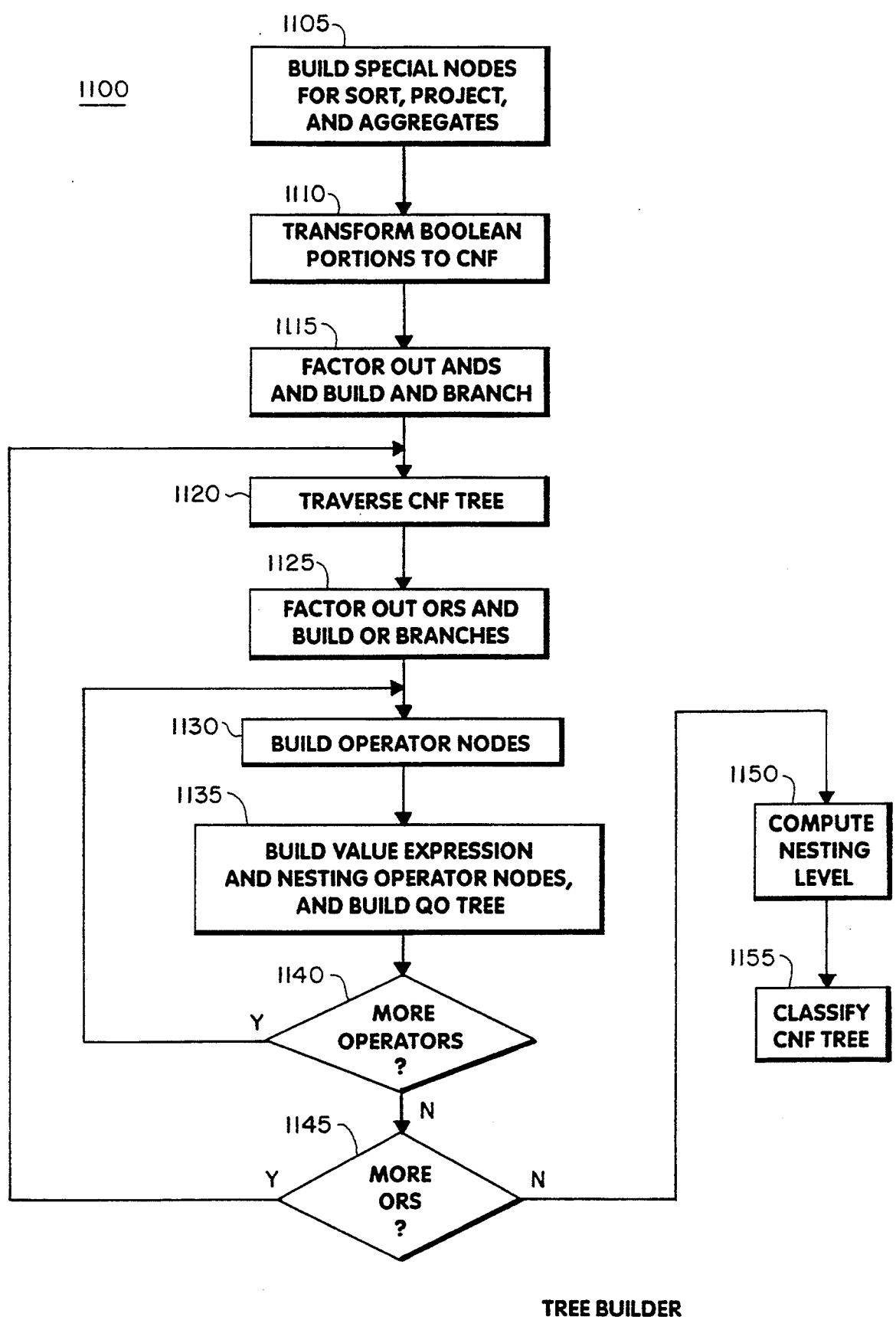
FIG. 11 is a flow diagram showing the steps for a tree builder algorithm used by the preferred implementation of the relational data access facility of this invention.

In the preferred embodiment, QO TB includes a tree builder work routine which builds the QO RSE tree and an RSE ID and CVAR (context variable) table described below. FIG. 11 shows a flow diagram 1100 for a tree builder work routine that is implemented by QO RB 332.

Initially, QO TB 332 calls DRT 320 to factor out SORTs PROJECTs, and AGGREGATEs so that QO TB 332 can build the appropriate special nodes or QO trees (Step 1105).

Next, QO TB 332 calls DRT 320 to transform the Boolean portions of the request into the CNF format (Step 1110). Algorithms for making such transformations are known to persons skilled in the art, and therefore will not be described.

Next, QO TB 332 calls DRT 320 to factor out the AND from the CNF, and QO TB 332 builds an AND BRANCH of the CNF tree (Step 1115).

The CNF tree is then traversed in a top-down first walk (Step 1120). DRT 320 is called by QO TB 332 to factor out the ORs, and QO TB 332 then builds the OR BRANCHES (Step 1125).

Then, for each operator in the corresponding OR BRANCH, DRT 320 is called by QO TB 332 to factor out each operator so QO TB 332 can build corresponding operator nodes (Step 1130). For nesting operators, such as ANY or UNIQUE, or for VALUE expressions, such as FROM, VIA, or STATISTICS, the node is marked as a level i+1 node, and a recursive call is made to add to the QO tree is built (Step 1135). As part of this operation, the pointer can be back filled to the node just created.

Next, a determination is made whether all operators have been processed (Step 1140). If so, then the remaining operators are located (step 1130, et. seq.). If not, a determination is made whether any OR BRANCHES remain (Step 1145). If so, the CNF tree is traversed again and the next OR is located (Steps 1120, et. seq.).

If no additional OR nodes remain, then the nesting levels are computed (Step 1150). The nesting level then becomes a cell in the operator node.

Finally, the CNF tree is classified (Step 1155). This classification involves determining whether each OR BRANCH in the CNF TREE for each RSE is either UNCORRELATED, DBKEY, SIMPLE, or DELAYED EXECUTION.

The tree builder work routine in FIG. 11 calls itself recursively for each new RSE found in a top-down depth first walk of the DRT tree. A QO RSE tree node is produced for each RSE in the DRT tree, and the builder work routine adds a new entry to an RSE table for each CVAR defined.

FIG. 12(a) shows an example of a RSE table 1200 built by QO TB 332. Table 1200, contains an RSE ID No. field 1210, and a Nesting Level field 1220 indicating the nesting level of the corresponding RSE.

The remaining field is the DCT REL ID field 1230. This field identifies the relation corresponding to the RSE.

In generating the Access Plan, QO APG 334 traverses the QO RSE tree to generate an access plan for each Boolean CNF tree, or RSE, in the QO RSE tree. QO APG 334 then combines the access plans generated for each Boolean CNF trees to form an Access Plan for the entire RSE tree.

The Access Plan is a queue of instructions to DCM 342 to execute the request. DCM 342 starts processing sequentially from the first instruction to the last instruction in the queue. QO APG 334 generates an optimized, or least expensive Access Plan based on an examination of I/O costs, CPU costs, and network costs.

The Access Plan also uses set-oriented operations so that elements of request processing system 340, such as DCM 342, operate on the entire data relation instead of on single tuples.

The data collections, or access plans, established for the RSEs are called SUBQUERY collections. The combined set of SUBQUERY collections established for a given DSRI request is called the QUERY collection. The data collection in a SUBQUERY can pass through four states in the process of its execution;
1. Filling State
2. Refining State
3. Propagation State
4. Deletion State.

All of the SUBQUERY collections pass through the Filling State. The other states are only for SUBQUERY collections established for inner RSEs in nested RSEs and a given DSRI requests.

A SUBQUERY collection goes through the Filling State when the data collections for the context variables defined in the RSE are being established.

A SUBQUERY collection goes through the Refining State after the Filling State when any of the data collections are being further refined by nested Boolean expressions, such as ANY or UNIQUE, or by nesting value expressions, such as VIA, FROM, or STATISTICS.

In the Propagation State, data tuples are computed from the SUBQUERY collection tuples and propagated to the outer RSE SUBQUERY collections. For example, when the nesting value expression VIA is being processed between two SUBQUERY collections, the inner RSE SUBQUERY collection is in a Propagation State.

When the data collection established for a SUBQUERY collection is no longer needed to process the remainder of the DSRI request, then the SUBQUERY collection is in the Deletion State.

As explained above, the complete Access Plan generated for an QO RSE tree can be considered as a queue.

As each access plan is generated by traversing the QO RSE tree, that plan is appended to the queue. The QO APG preferably traverses the RSE tree using a bottom-up, recursive tree traversal algorithm. For each RSE, QO APG 334 generates the portion of the Access Plan which insures that the SUBQUERY collection reaches the Filling State.

Figure 13:
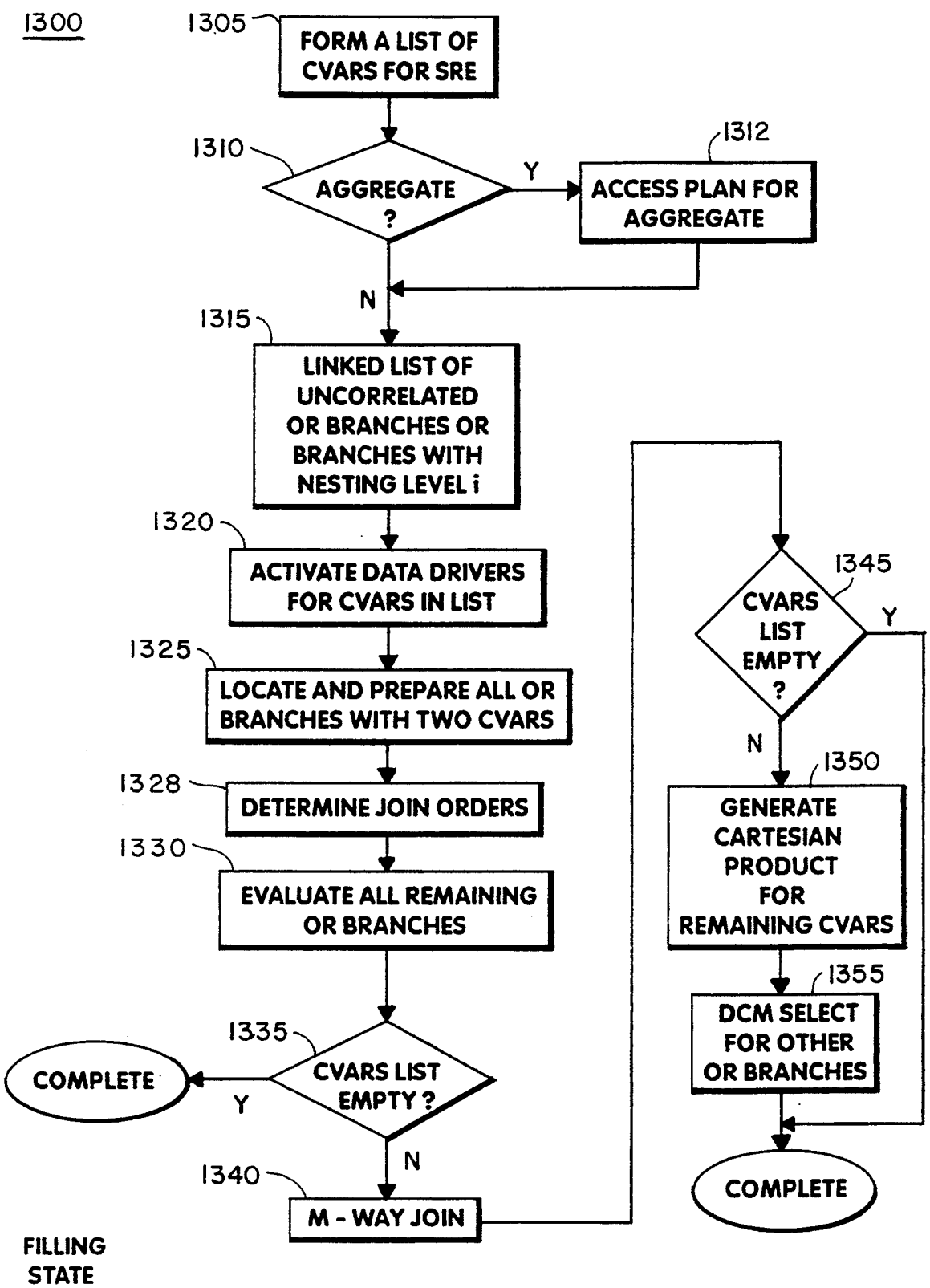
FIG. 13 is a flow diagram showing steps for data collection in a Filling State.

A flow diagram 1300 in FIG. 13 shows steps for the data collection in the Filling State. Flow diagram 1300 insures that the data collections for CVARs defined in the RSE are established. Flow diagram 1300 also makes use of a Join Optimizer (JO) 335 (FIG. 3) to evaluate the join order for the data relations. JO 335 is preferably a software procedure executed by QO APG 334 to determine the optimal join order.

In the Filling State access plan generation flow diagram 1300, a list of CVARs defined in an RSE is formed from the QO RSE tree (Step 1305). This is a RSE ID and CVAR table, such as table 1250 in FIG. 12(b).

RSE ID and CVAR table 1250, which is preferably the first block of any Access Plan formed QO APG 334, contains the list of RSE IDs in the DSRI request and a list of context variables (CVARS) used in each RSE. As table 1250 shows, the RSE ID and CVAR table preferably contains four fields. RSE ID field 1260 contains a unique identifier for the particular RSE. CVAR field 1270 contains a unique identifier for a context variable for the corresponding RSE.

The DATA SOURCE field 1280 indicates the source of the data. In the preferred embodiment, there are six values that can be used for DATA SOURCE field 1280. These values indicate whether the data tuples are from the non-relational data file, whether data tuples are formed on the fly during a VIA operation, whether the data tuples are formed on the fly during a FROM operation, whether the data tuples are GROUP BY keys formed on the fly, whether the data tuples are the results of computing STATISTICAL values, or whether the data tuples are the results of processing a MAP statement.

The remaining field is the DCT REL ID field 1290. This field identifies the dictionary in which the relation metadata is stored for the corresponding context variable.

RSE ID and CVAR table 1250 is used by QO APG 334 and by DCM 342 to obtain the metadata for each of the relations referred to by the corresponding context variable.

If any of the CVARs is an AGGREGATE (Step 1310), then the access plan is generated to process the aggregate (Step 1312). An AGGREGATE includes the SUM, MIN, MAX, COUNT and AVERAGE operators.

Next, a linked list is formed of all the OR BRANCHES in the CNF tree which have nesting level i operators or which are uncorrelated (Step 1315).

Figure 14:
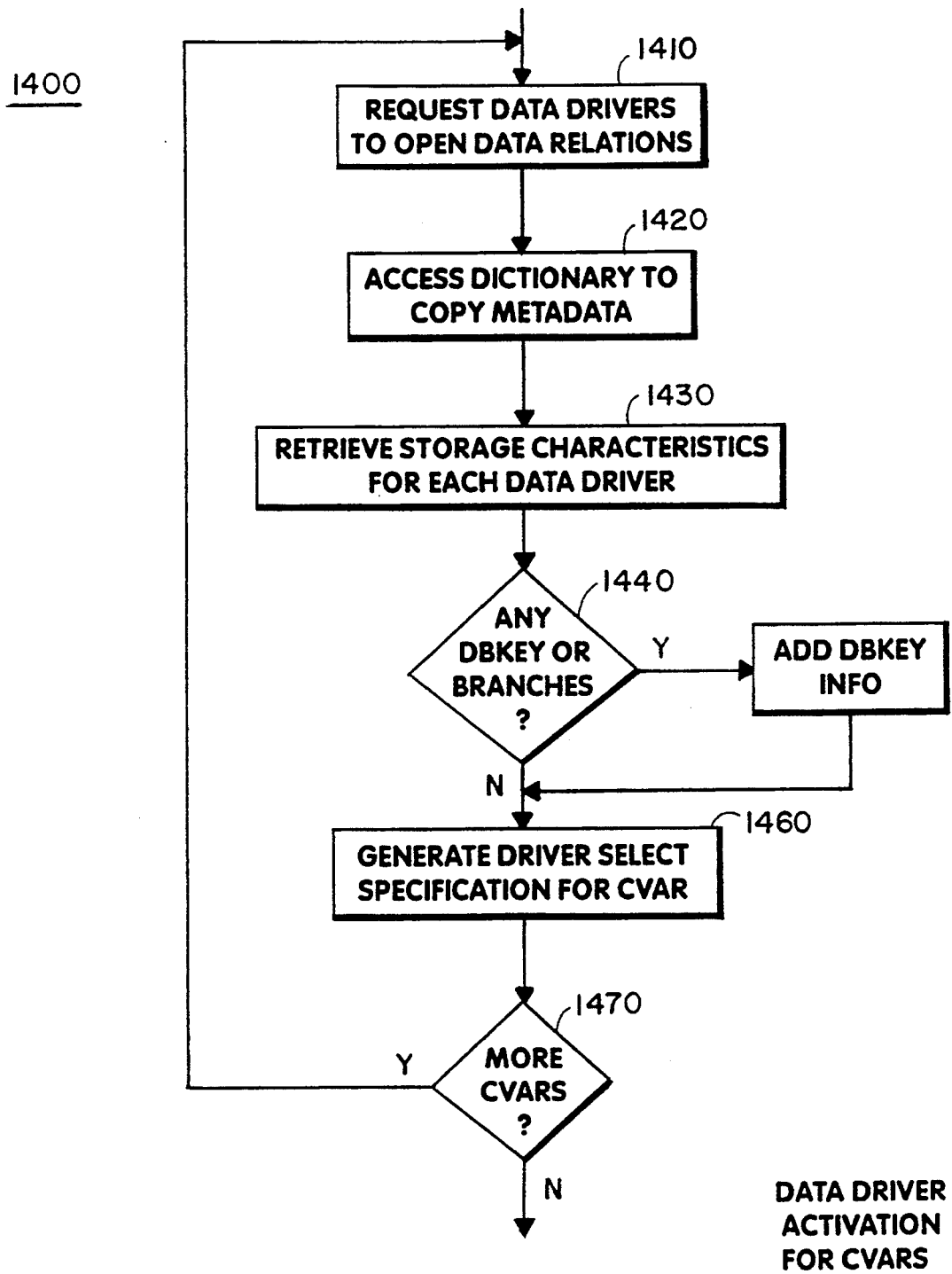
FIG. 14 is a flow diagram of a preferred procedure for activating data drivers for context variables.

The data drivers are then activated for all of the CVARs in RSE ID CVAR table 1250 for the Access Plan (Step 1320). FIG. 14 shows a flow diagram 1400 containing a preferred procedure for activating the data drivers for the CVARs.

First, the data drivers are requested to open the data relations (Step 1410). The specific method for accomplishing this step is described in detail below in the discussion of data drivers.

Next, the appropriate dictionary is accessed to make a copy of the metadata information for the needed data drivers (Step 1420). The storage characteristics for each of the data drivers are then retrieved (Step 1430).

A determination is then made whether there are any DBKEY OR BRANCHES for the corresponding CVAR (Step 1440). This is also done by accessing the tree. If so, the DBKEY information is appended to the DRIVER SELECT specification. A DRIVER SELECT specification is then generated for that CVAR (Step 1460).

Next, a determination is made whether any CVARs remain (Step 1470). If so, the process is repeated. Otherwise, the procedure is complete.

Figure 15:
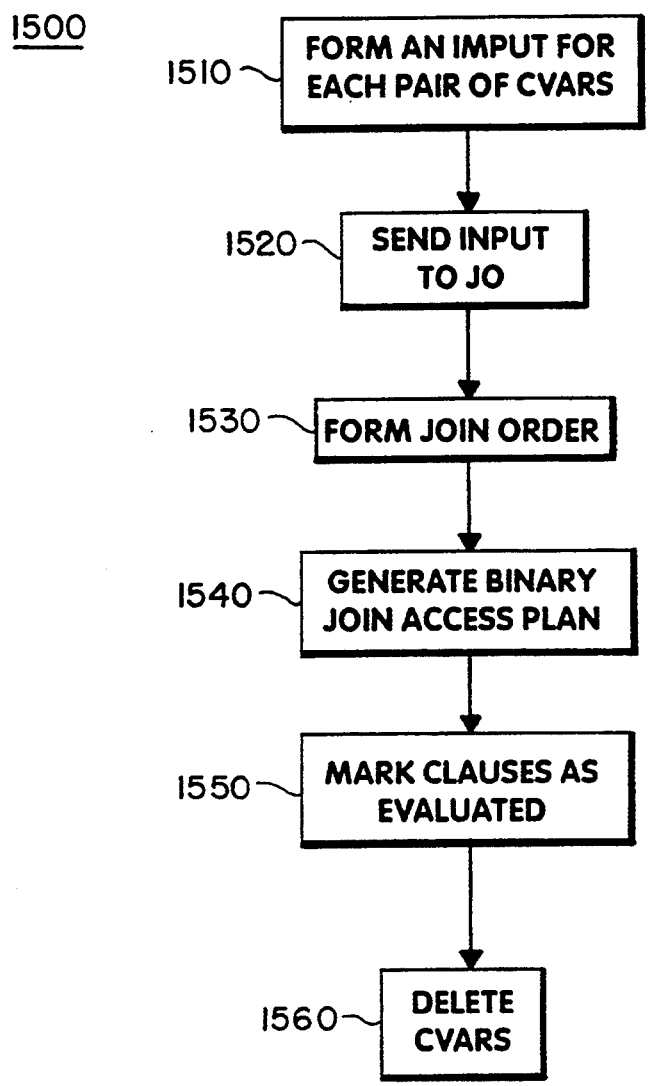
FIG. 15 is a flow diagram of a preferred method for locating OR BRANCHES that have two context variables.

Returning to flow diagram 1300 in FIG. 13, the next step is to locate and prepare all of the OR BRANCHES that have two CVARs (Step 1325). The preferred method of preparing such OR BRANCHES is flow diagram 1500 shown in FIG. 15.

In flow diagram 1500, an input for all pairs of CVARs are formed for JO 335 (Step 1510). The pairs of CVARs are then given as an input to JO 335 (Step 1520). JO 335 then outputs an optimal join order (Step 1530). Next, Binary Join Access Plans are generated (Step 1540). All of the OR BRANCHES used in the join order are then marked as evaluated (Step 1550). Finally, all the CVARs in the join order are deleted from the CVARs list (Step 1560).

Figure 16:
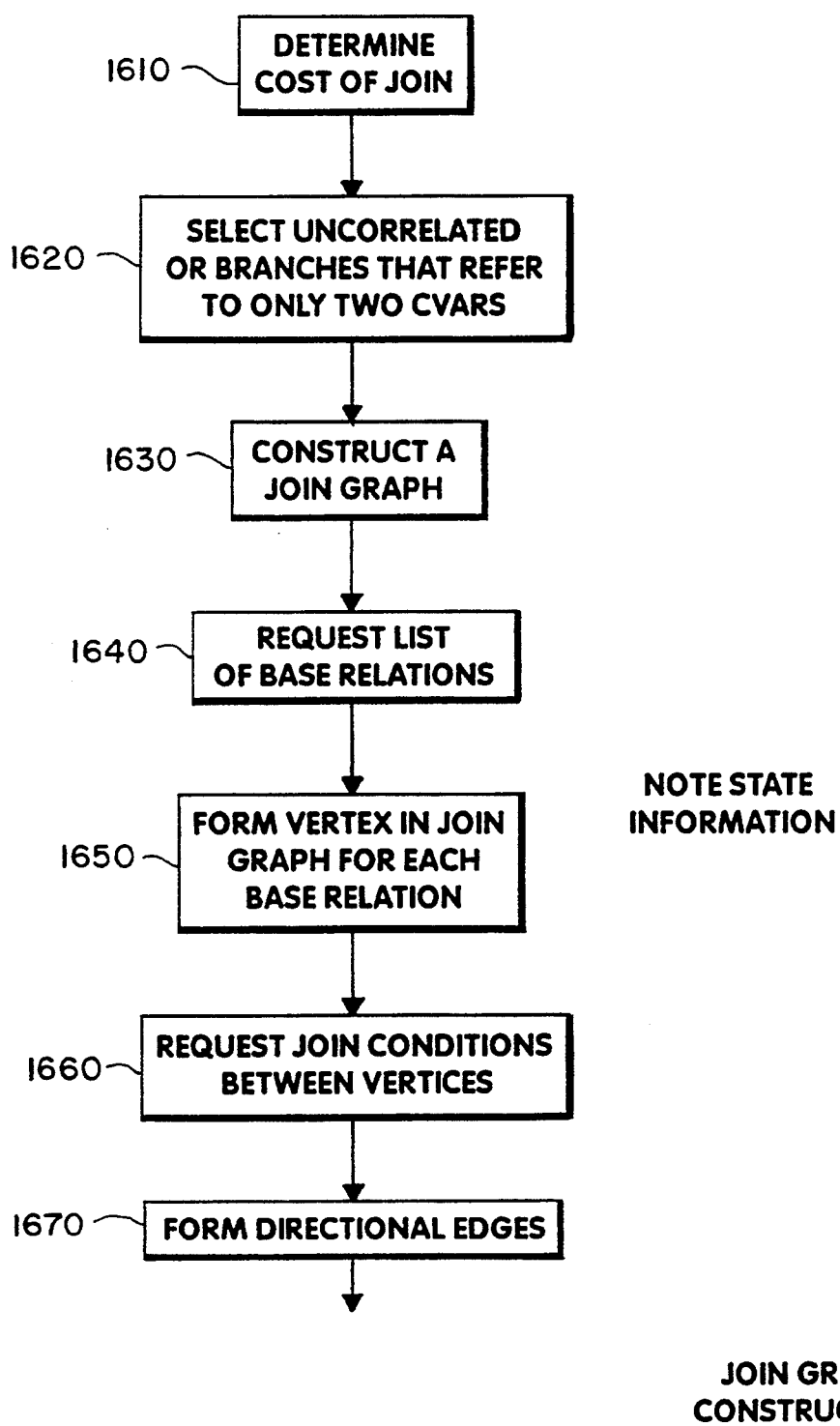
FIG. 16 is a flow diagram of a preferred procedure used by a Join Optimizer to build a join graph.

The join order is determined by JO 335 in QO APG 334 using cost analysis. FIG. 16 shows a flow diagram 1600 of a procedure used by JO 335 to build a join graph for use in determining the least-cost join order. First, QO APG 334 determines the cost of the join from the base relation cardinality (i.e., the number of tuples), the tuple length, selectivity factors, and the cost formulas (Step 1610). The cost factors considered by QO APG 334 include cost of reading the relation tuples, the cardinalities of the relations involved, and the cost of performing the join operation between two relations.

A selectivity factor is a fraction of the original relation cardinality after a selection is applied on a relation. FIG. 17 includes a table 1700 indicating preferred selectivity factors used in the preferred implementation to estimate the cardinality of relations after a SELECT operation.

The cost of reading the relation tuples depends upon the I/O costs, network costs, tuple length, and data driver efficiency. The relations' cardinalities involve selectivity factors in base relation cardinality. The cost of performing join operations depends upon whether the join is an EQUII join, a nested looped join, or a CARTESIAN product.

The cost of performing a join depends upon relation cardinalities, relation tuple length, and data location of relations, such as whether the data is stored at a local or remote location. The relation cardinalities are estimated from the base relation cardinalities and the SELECTIONS applied on base relations.

FIG. 18 is a table 1800 showing a list of the preferred cost formulas for data retrieval, join processing, data aggregation, and data sorting. Preferably JO 335 uses such a list for its evaluations.

Returning to flow diagram 1600 in FIG. 16, the OR BRANCHES that are uncorrelated and refer to only two context variables are selected from the CNF tree for the RSE for optimizing the join order (Step 1620). The inputs to and output from the JO are shown in FIGS. 19 and 20.

In FIG. 19, inputs array 1900 includes CVAR 1 1905 and CVAR 2 1910 which identify the context variables which are inputs. Card 1 1915 and card 2 1920 are the cardinalities of the context variable inputs. I/O cost per tuple 1 1925 and I/O cost per tuple 2 1930 are the I/O costs of the context variable inputs. Nested LOOP/HASH 1940 describes the type of joins. Join Selectivity 1950 identifies the join selectivity determined, for example, from table 1700. OR BRANCH ID in CNF 1960 is used to identify the corresponding OR BRANCH.

In FIG. 20, the outputs array 2000 includes Inner Rel CVAR 2010 and Outer Rel CVAR 2020 which specify the join order of the context variable inputs. Nested Loop/Hash 2030 identifies the type of join. OR BRANCH ID in CNF 2040 identifies the OR BRANCH.

Initially, JO constructs a join graph to determine the minimum-cost join order for all the relations in the RSE (Step 1630 in FIG. 16). The join graph contains all the base relations in the RSE represented as vertices and the join conditions represented as edges.

In building the join graph, JO 335 requests from DRT 320 the list of base relations (Step 1640). For each of the base relations, JO forms a vertex in the join graph (Step 1650). JO 335 then requests DRT 320 to supply the join conditions between any two vertices (Step 1660).

For each of those join conditions, JO 335 forms two directional edges to connect the vertices (Step 1670). The direction of the edge indicates the inner and outer relations of the join operation. The inner and outer relations indicate the order of the join operations. The starting vertex for the edges is the inner relation and the other vertex is the outer relation. A join condition between two relations can be evaluated by taking either of the vertices as the inner relationship.

The join graph has four basic characteristics. First, all of the edges in the graph are directional. Second, there could be more than one edge connecting two vertices in the join graph. For each of the join conditions to be evaluated between base relationships, there are two edges connecting the vertices, one in each direction.

Third, there are three pieces of information associated with each edge of the join graph. One is the algorithm for evaluating the join condition. That join condition could be, for example, Hash Join or Nested Loop Join. A second piece of information is the selectivity of the join, which is determined by JO 335 using selectivity factors such as those in table 1700 of FIG. 17. The third piece of information is the cost of performing the join. This cost is determined from the cardinalities of the previous join operations.

The fourth characteristic is that two pieces of information are associated with vertex of the join graph. The first is the base relation cardinality after selection (if any) is performed. This cardinality can be determined from the selectivity factor and the relation cardinality obtained from the data driver. The second piece of information associated with each vertex is whether the data location is local or remote.

Figure 21:
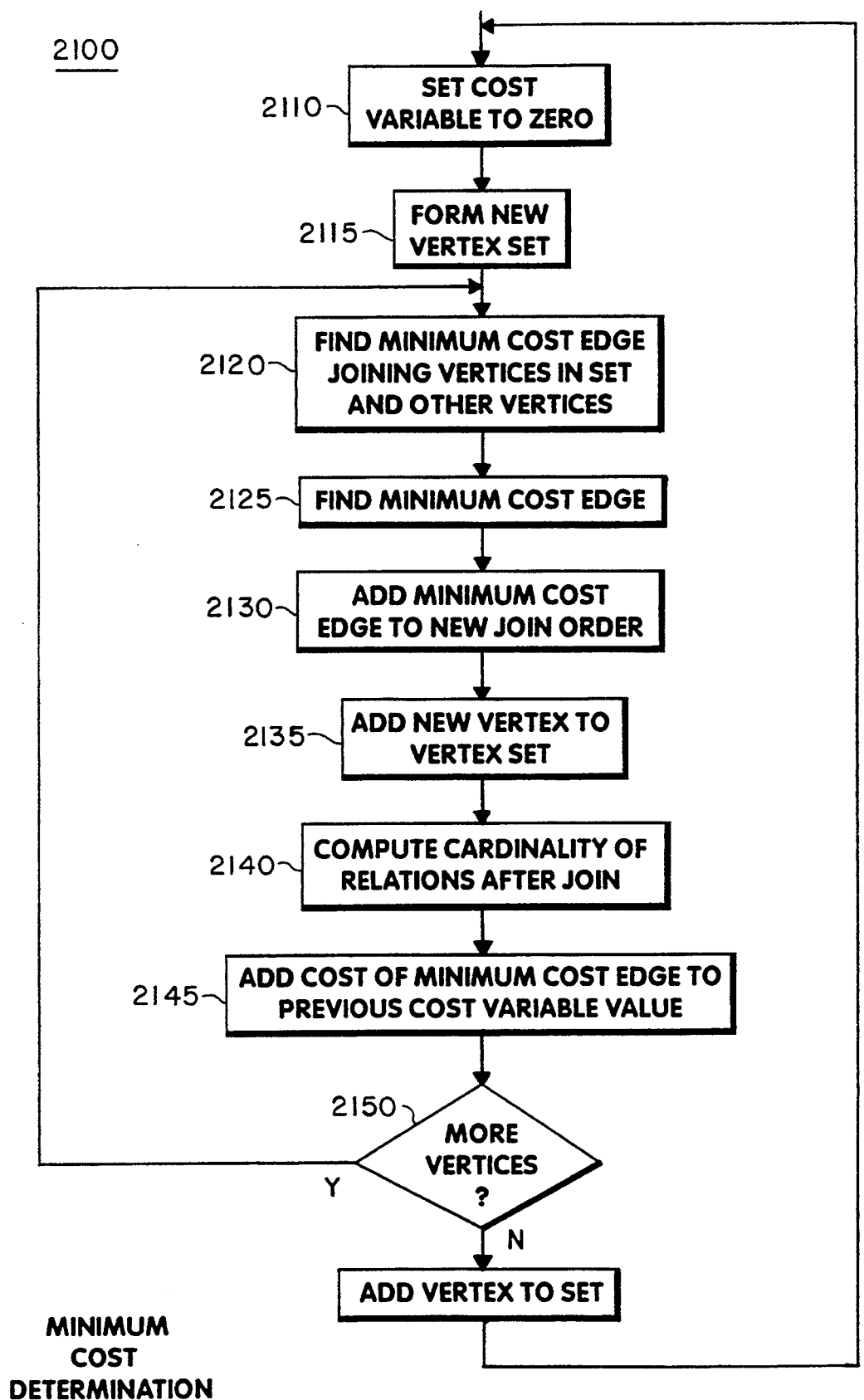
FIG. 21 shows a diagram for a preferred procedure to determine a minimum cost join order.

FIG. 21 shows a flow diagram 2100 for a preferred procedure to determine the minimum cost join order. The procedure in flow diagram 2100 is performed by JO 335 for each vertex in the join graph.

First, a cost variable for the vertex is initialized to zero (Step 2110). Next, a new vertex set N is formed (Step 2115). Initially, set N contains only the vertex under examination.

A loop begins starting with a determination of a minimum cost edge joining the vertices between the vertex set N and the remaining vertices. This involves first computing the cost of all the edges to and from the vertices in vertex set N to all of the other vertices (Step 2120). If there is a Hash Join between two vertices $V_n$ and $V_m$, then the cost of the edge is $$(\text{Cardinality } (V_n) \times (\text{I/O cost per } (V_n) \text{ tuple})) + (\text{Cardinality } (V_m) \times (\text{I/O cost per } (V_m) \text{ tuple}))$$

If there was a Nested Loop Join between those two vertices, then the cost of the edge is equal to $$(\text{Cardinality } (V_n) \times (\{\text{I/O cost per } (V_n) \text{ tuple}\} + (\{\text{Cardinality } (V_m)\} \times \{\text{I/O cost per } (V_m) \text{ tuple}\})).$$

Next, the minimum cost edge, $E_{xy}$, is found (step 2125). Edge $E_{xy}$ is then added to the new join order (Step 2130).

A new vertex is then added to the vertex set N (Step 2135), and the cardinality of the vertex set N is computed dynamically after the join is performed (Step 2140). The cardinality of all of the vertices in the vertex set N equals the product of the join selectivity, the cardinality of vertex $V_n$ and the cardinality of vertex $V_m$.

The minimum cost variable for the vertex $V_i$ is then set to the previous value plus the cost of the edge $E_{xy}$ (Step 2145).

If all the vertices have been added to set N (Step 2150), the next vertex is examined, and control returns to Step 2110. Otherwise, the minimum cost edge joining the vertices between those in set N and the other vertices is found by returning to Step 2120.

JO 335 preferably builds a table listing the minimum cost for each starting vertex and identifying the corresponding join order for that minimum cost. The minimum cost join order for the entire procedure is the one which is the minimum in the table, and the corresponding join order is the one chosen by the procedure.

As an added note, the procedure described above in association with FIG. 21 actually has an inner loop which binds the minimum cost spanning tree using each vertex of the join graph as a root. This inner loop preferably uses the Kruskal Algorithm for selecting the minimum cost spanning tree.

Control is then returned back to procedure 1300. All the OR BRANCHES that remain unevaluated after the use of JO 335 are the evaluated. This involves generating a DCM SELECT specification for each of the OR BRANCHES.

Figure 22:
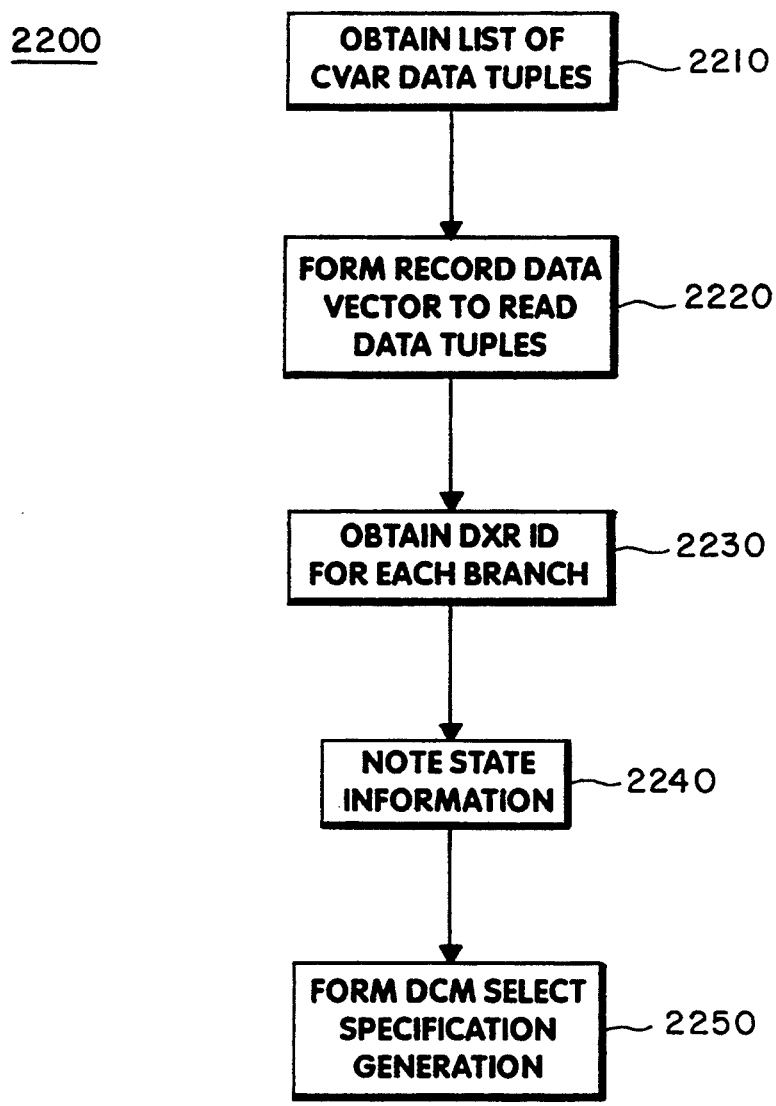
FIG. 22 is a flow diagram for a preferred procedure access plan generation for a DCM SELECT OPERATION.

FIG. 22 shows a flow diagram 2200 for a preferred access plan generation for the DCM SELECT operation. First, QO APG 334 obtains a list of context variable data tuples required to be evaluated in the OR BRANCH or the OP BRANCH in the CNF tree (Step 2210). Next, a record data vector is formed to read the data tuples from the data collections for the DXR identification (Step 2220). DCM 342 (FIG. 3) uses a record data vector to exchange data with DXR EVAL 36.

FIG. 23 shows an example of Record Data Vector (RDV) 2300 which is preferably a linked list. As shown in FIG. 23, Record Data Vector 2300 includes an DCT REL ID field 2310, a Context Variable field 2320, a field data vector (FDV) field 2330, a data pointer field 2340, a DBKEY value pointer field 2350, and a next entry field 2360.

The DCT REL ID field 2310 is an identifier to the relation metadata stored by the corresponding dictionary. Context Variable field 2320 uniquely identifies the context variable in the RSE. FDV field 2330 identifies a field data vector. Data pointer field 2340 points to the data location of the record tuple. DBKEY value pointer field 2350 points to the DBKEY. NXT ENTRY field 2360 is used to implement the linked list. This field is null for the last entry in Record Data Vector 2300.

The purpose of the field data vector is to indicate the information stored through to the data tuples in the data collection maintained by DCM 342. Because not all of the fields in the data tuple are used in query execution, the fields in the field data vector indicates only the fields which are used in query execution. Those fields are called active fields, and the data for the fields in a relation tuple stored in data collection, are shown in FIG. 24 in a Field Data Vector (FDV) 2400. Preferably, Field Data Vector 2400 is a linked list.

In FIG. 24, Field Data Vector 2400 includes three fields. DCT Field ID 2410 identifies the field metadata information in the dictionary. Field offset field 2420 is the offset of the field data in the relation tuple stored in DCM 342, and is computed by QO APG 334. NXT ENTRY field 2430 points to the next field entry to implement the linked list. This entry is null for the last entry in Field Data Vector 2400.

Next, the DXR ID for each OR BRANCH or OP BRANCH in the CNF tree is obtained (Step 2230). DXR ID is a location of a procedure which DXR EVAL 346 uses to evaluate the corresponding OR BRANCH.

Then, a determination is made to see whether the DCM SELECT is being used in the FILLING STATE or in the REFINING STATE process (Step 2240). Finally, a DCM SELECT specification is formed (Step 2250).

Figure 25:
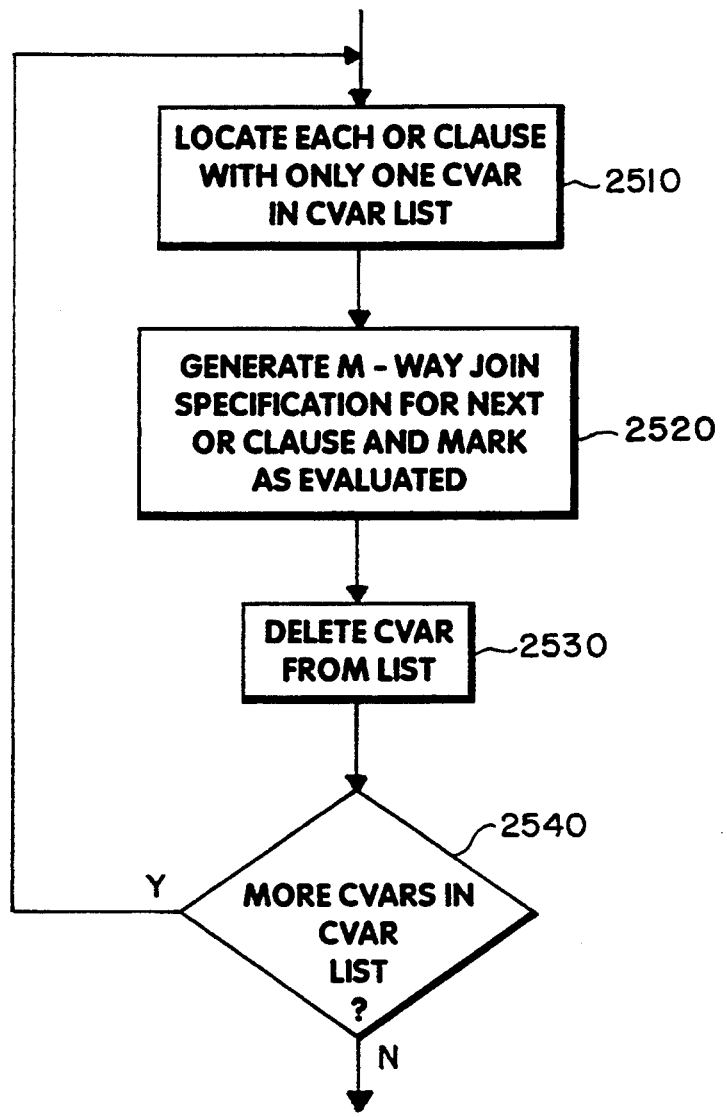
FIG. 25 is a flow diagram of a preferred implementation for an M-WAY JOIN.

Returning to flow diagram 1300 in FIG. 13, if the CVAR list is empty (Step 1335), then the procedure is complete. Otherwise, M-WAY JOINS are implemented (Step 1340). A flow diagram 2500 for implementing an M-WAY JOIN can be seen in FIG. 25.

In flow diagram 2500, each OR BRANCH is located that has a single CVAR in the list and the remainder of the CVARs not in the list (Step 2510). For each of those clauses, an M-WAY JOIN specification is generated and the clause is marked as evaluated (Step 2520). That CVAR is then deleted from the CVAR list (Step 2530). This procedure continues for each OR BRANCH located in Step 2510 (Step 2540).

Returning to FIG. 13, if the CVARs list is empty (Step 1345) the procedure is complete. Otherwise, a CARTESIAN product is generated for the remaining CVARs (Step 1350). For all of the OR BRANCHES that are not evaluated, a DCM SELECT is generated (Step 1355).

All of the uncorrelated OR BRANCHES will be evaluated in the Filling State. The other OR BRANCHES will be evaluated in the other states.

Figure 26:
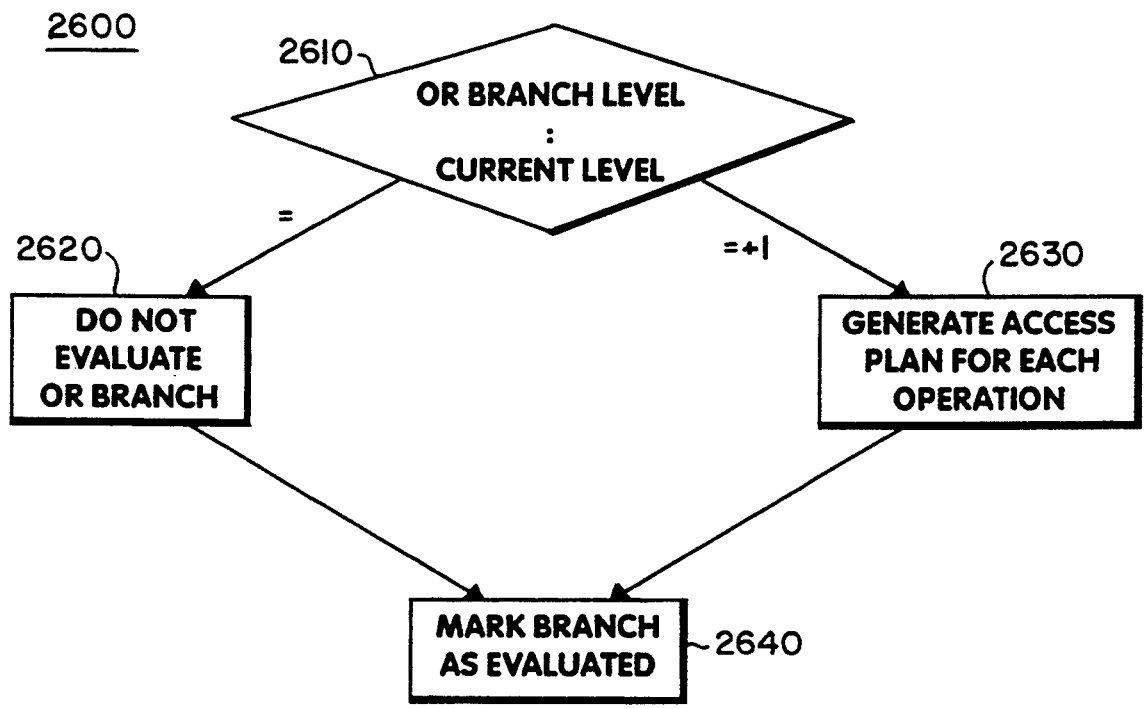
FIG. 26 is a flow diagram for a preferred implementation for generating an Access Plan for a SIMPLE OR BRANCH.

In generating the Access Plan for the QO RSE trees, QO APG 334 evaluates the OR BRANCHES in the CNF trees. The evaluation is necessary because the individual RSE access plans depend upon the type of branches. FIG. 26 shows a preferred flow diagram 2600 for the generation of an access plan for a SIMPLE OR BRANCH.

The first step in flow diagram 2600 is a comparison of the level of the OR BRANCH (i.e. the operators in that OR BRANCH) and the current level (Step 2610). If all of the operations in the CNF tree for an OR BRANCH have the parent RSE level, then this OR BRANCH is not evaluated because it will be evaluated during the evaluation of the parent RSE (Step 2620).

If all of the operations in the RSE are at the current level of the RSE plus one, then for each of the operations in that OR BRANCH, an access plan is generated for a nesting operator (Step 2630).

At the end of flow diagram 2600, the OR BRANCH is marked as evaluated (Step 2640).

Figure 27:
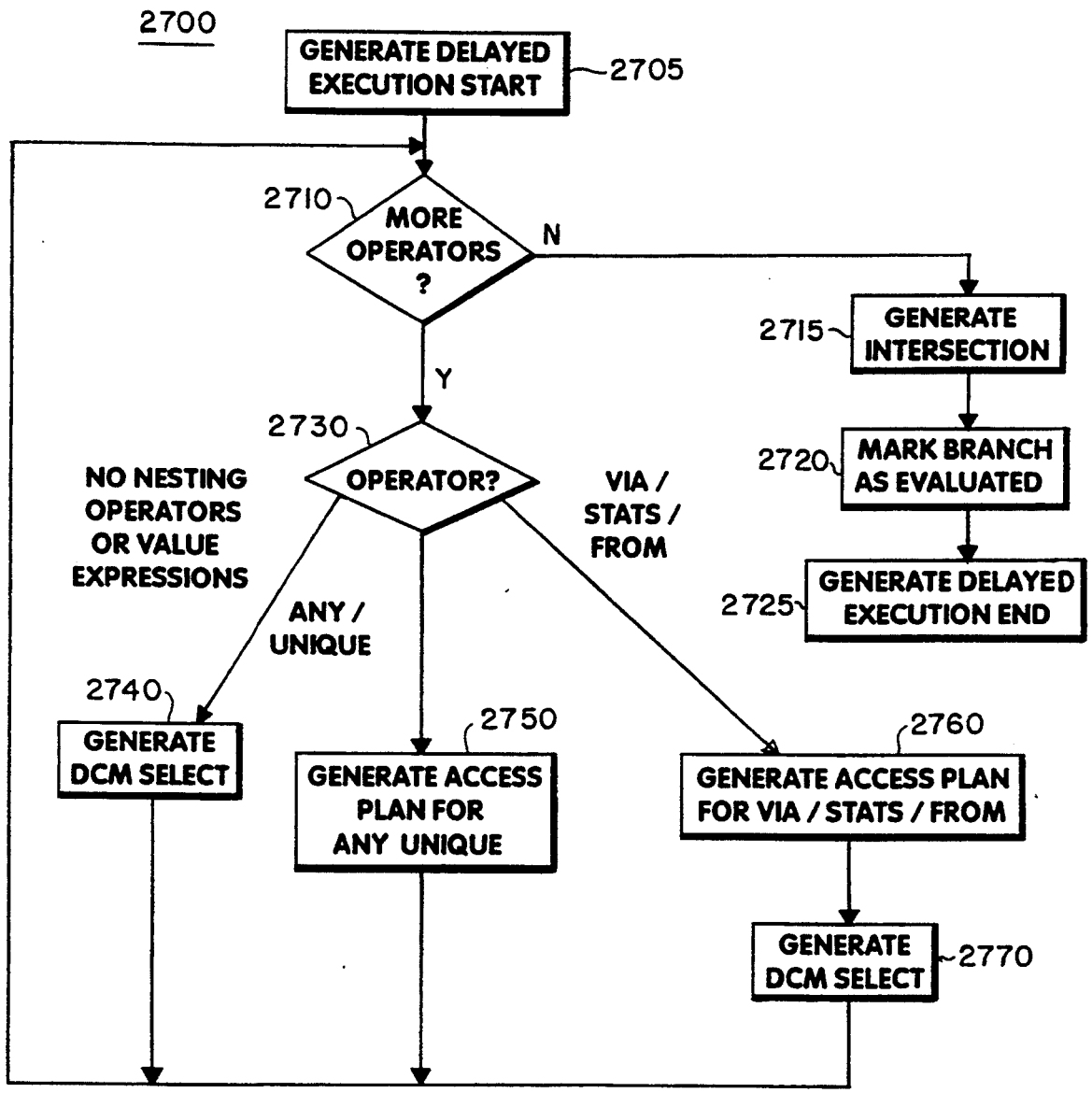
FIG. 27 is a flow diagram for a preferred implementation for generating an Access Plan for a DELAYED EXECUTION OR BRANCH.

FIG. 27 shows a flow diagram 2700 for a preferred process of generating an access plan for a DELAYED EXECUTION OR BRANCH. A Delayed Execution Start is generated to delimit flow diagram 2700. This ensures that the steps in flow diagram 2700 are repeated for each tuple in the RSE collection.

Next, a determination is made to see whether there remain any of the operators that have not been evaluated (Step 2710). If not, then an intersection is generated of all the prior results (Step 2715) and the OR BRANCH is marked as evaluated (Step 2720). A Delayed Execution End is also generated to mark the end of flow diagram 2700.

If there are operators that have not been evaluated, the next operator is evaluated (Step 2730). If there are no nesting operators or value expressions, then the DCM SELECT is generated (Step 2740).

If the operator is ANY or UNIQUE, then an access plan is generated for ANY or UNIQUE, whichever is appropriate (step 2750).

If the operator is VIA, STATS, or FROM, then an access plan is generated for the VIA, STATS, or FROM, whichever is appropriate (Step 2760), and a DCM select is generated (Step 2770).

After taking these actions, the determination of whether any other operators remain is repeated (Step 2710).

b. Access Plan

As explained above, QO APG 334 forms the Access Plan as a queue of instructions for all the RSEs, and adds entries to the queue as the access plan is being generated. QO APG 334 groups data collections on an RSE basis. All of the data relations in an RSE have data collections grouped together. There is thus a one-to-one mapping between data tuples in each data collection for the RSE. The Access Plan instructions operate on the data collections in an RSE or across data collections from two RSEs.

Figure 28:
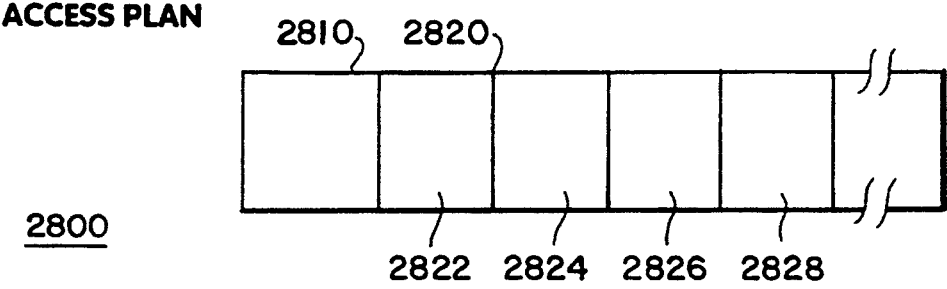
FIG. 28 shows an example of an Access Plan generated by a preferred implementation of a Query Optimizer Access Plan Generator.

FIG. 28 shows an Access Plan 2800 generated by QO APG 334. As explained above, RSE ID and CVAR table 2810 is preferably the first entry in Access Plan 2800 and contains a list of RSE IDs using the Access Plan, and a list of the context variables used for each of the RSE IDs in the list.

After RSE ID and CVAR table 2810 is the instruction portion 2820 for the operations on data collections. These instructions, shown as instructions 2822, 2824, 2826, and 2828, include operations for a single RSE and operations between data collections for two RSEs.

In the preferred embodiment, there are eleven operations which are used for processing simple RSEs. DRIVER SELECT specifies the selection that can be performed by the data driver on the base relation data before the data enters the data collection. DCM SELECT specifies a selection to be performed by DCM 342 on the data relations within the RSE. PROJECT specifies the PROJECT operation to be done on the data. BINARY JOIN specifies the JOIN operation between two data relations. M-WAY JOIN specifies the JOIN operation between more than two data relations.

SORT specifies the sorting order for the data collections in DCM 342. GROUP BY specifies the GROUP BY operation in the storage of group values in a temporary relation. The temporary relation is stored as data collection among the RSE collections.

INTERSECTION specifies that DCM 342 performs an intersection set operation on the data collections. DATA OUTPUT specifies the list of relation data tuples to be outputted as an end result. DELETE RSE causes DCM 342 to delete all the data collections established for the RSE. DELETE COLLECTION causes DCM 342 to delete one data collection within the RSE.

In the preferred implementation, there are seven operations between data collections across two RSEs. VIA computes a value from the data tuples in the inner RSE collection and stores the computed value in the outer RSE collections. ANY selects tuples in the outer RSE data collections based on the inner RSE data tuples. UNIQUE selects some tuple in the outer RSE data collections based upon the inner RSE data tuples. FROM computes a value from the data tuples in the inner RSE collections and stores the computed value in the outer RSE data collections (if a temporary value cannot be computed, an error is reported). MAP is used whenever an aggregate value is computed from the data tuples in the inner RSE data collections, causing the values to be stored in a temporary data collections in the outer RSE data collections. STATISTICAL VALUE specifies the STATISTICAL VALUE to be computed from the data tuples in the Inner RSE, the data being stored along with the data tuples from the Outer RSE.

In placing the operations in order for the Access Plan, QO APG 334 performs certain optimizations. For simple RSEs, the least cost join order is determined. The SELECTs are evaluated by the data drivers, not by NSDS 305. Also the PROJECT and SORT are delayed in the execution process to reduce the number of tuples that DCM 342 needs to operate on.

For nested RSEs, the data collections for the lower level RSEs are deleted as soon as the collections are used in evaluating the data for RSEs at higher levels. In addition, QO APG 334 avoids performing CARTESIAN products to evaluate the Boolean expressions in each RSE to the extent possible.

FIG. 29 shows an access plan which is generated for nested RSEs with correlation. The query would be as follows: SELECT college name, city, state
FROM: colleges_c
WHERE NOT EXISTS (SELECT d.college_code)
FROM degrees_d
WHERE d.college_code=c.college_code The access plan queue shown in FIG. 29 has five instructions. The first instruction 2910 is an DRIVER SELECT with RSE 1 as degrees. Instruction 2920 is an DRIVER SELECT with RSE 2 as colleges.

Then, a NOT ANY instruction is inserted for RSE 1 (i.e., degrees) and RSE 2 (i.e., colleges), and d.college_code=c.college_code.

The next instruction 2940 is the DELETE RSE element 2940 for RSE 1. Finally, there is an DATA OUTPUT instruction 2950 for RSE 2:colleges.

FIG. 30 shows an Access Plan queue 3000 that would be generated in the preferred implementation for the following sample SQL query:
Select e.last_name, e.first_name, sh.salary FROM employees,
salary_history sh.job_code jc
WHERE e.employee_id=sh.employee_id. AND e.employee_id=jc.employee_id AND sh.salary_end
is null AND jc.job_code="Manager"

Access Plan Queue 3000 shows the first instruction 3010 is a DRIVER SELECT command for employees. The next 3020 instruction is a DRIVER SELECT command for salary_history=salary_end is null. The third instruction 3030 is a DRIVER SELECT command for job_code="job_code=MANAGER."

The fourth instruction 3040 is a JOIN command of e.employee_id =jc.employee_id. The fifth 3040 instruction is a JOIN command for e.employee_id=sh.employee_id. The next instruction is 3050 a DELETE collection for job_code. The last instruction is a DATA OUTPUT command for employee and salary_history.

As is apparent, QO APG 334 must obtain from the data drivers certain information such as relation cardinality and record or tuple length, data location information, such as whether the data is remote or local, and indices on a given relation. This is done by way of a DRIVER SELECT specification.

Figure 31:
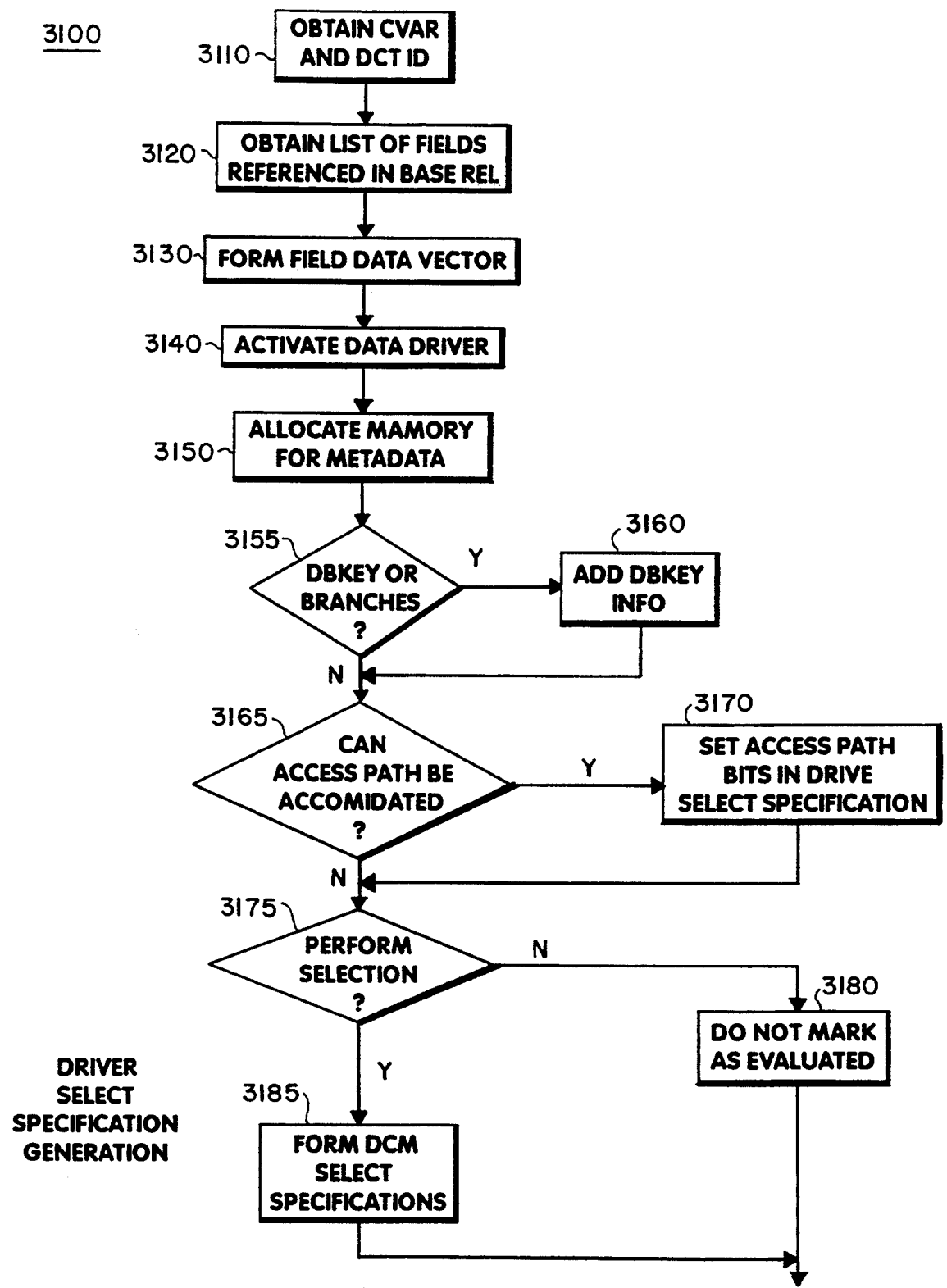
FIG. 31 is a flow diagram for a preferred implementation of access plan generation of the DRIVER SELECT specification.

FIG. 31 shows a flow diagram 3100 for a preferred procedure for access plan generation of the DRIVER SELECT specification. When QO APG 334 generates DRIVER SELECT specifications, it interacts with the data drivers to activate the drivers, retrieve the storage characteristics of the data relation, request the data drivers to allocate memory for the metadata information, pass the metadata information to the data drivers, and then generate any code necessary for DBKEY OR BRANCHES.

The DRIVER SELECT specification is generated so the data driver can perform date selection the driver level. If not, DCM 342 performs the data selection on the data tuples. In addition, the QO APG 334 advises DCM 342 if a given data driver is supplying data for a primary data collection in a SUB-QUERY collection.

In flow diagram 3100, the context variable and the dictionary id for the basic relation is obtained (Step 3110). Next, the list of fields in the base relation referenced in the RSE is obtained (Step 3120). A field data vector is formed for the base relation (Step 3130). The data driver is then activated to obtain the storage characteristics the data driver (Step 3140).

Next, the data driver is requested to allocate memory for metadata information, and the dictionary is requested to copy the metadata information and pass it to the data driver (Step 3150).

An inquiry is then made as to the presence of any DBKEY OR BRANCHES to be used (Step 3155). If so, the DBKEY information is appended to the specification (Step 3160).

The next question is whether the data drivers can accommodate the access path, if one is present (Step 3165). If so, access the path bits are set for the DRIVER SELECT specification (Step 3170).

QO APQ then queries the data driver to see whether it can perform the data selection (Step 3175). If not, the branch is not marked as evaluated (Step 3180) and a DCM SELECT specification will be generated later. If so, the DRIVER SELECT specification is completed and the OR BRANCH is marked as evaluated (Step 3185).

An example of a DRIVER SELECT specification block or instruction 3200 is shown in FIG. 32. DRIVER SELECT specification access plan block 3200 includes a DRIVER SELECT header 3201 with two subfields. On subfield identifies the DRIVER SELECT specifications as a DRIVER SELECT block, and the other subfield contains an address of the next Access Plan block. The blocks are preferably in a linked list.

Block 3200 also includes an RSE identifier 3202 for the group of data collections established for the corresponding RSE, and a context variable pointer 3204, which points to the context variable that is used for the RSE. The Primary Collection flag 3206 indicates whether the data relation is the primary or secondary data collection for the SUB-QUERY collection.

The Function Vector pointer 3208 is used by DCM 340 to access the data. Relation handle 3210 is assigned by the data driver to refer to the corresponding data relation for this specification.

The Field Name list 3215 is an address to a field name list array that has been allocated by the data drivers for metadata information for the corresponding relation. The Field Length list 3220 is an address to a field length list array that has also been allocated by the data driver for metadata information. The Field Datatype list 3225 is a pointer to a Datatype List Array also allocated by the data drivers for metadata information. Field Scale list 3230 is a pointer to a Field Scale List Array also allocated by the data drivers for metadata information.

The Input Field Data Vector 3235 gives the fields of the data record and the location in the record buffer obtained from the data driver. The Output Field Data Vector 3240 gives the list of fields in any given relation that are used in executing the different queries.

The Input Tuple Length 3245 is the actual length in bytes of each data tuple or record obtained from the corresponding dictionary. The Output Tuple Length 3250 is the actual length in bytes of each data tuple retained by DCM 340, and is described by the Output Field Data Vector.

The DBKEY length 3255 is the length in bytes of each DBKEY for all the data tuples. The Cardinality Value 3260 is the relation cardinality after selection is applied by the data driver. The DXR ID 3270 is used for evaluating the DBKEY selection. The Message Num list 3275 is a list of message parameter values.

The Driver Select Information 3280 identifies the source of the DRIVER SELECT specification. The Driver Access Path Information 3285 contains information about any indexing.

Finally, a note is made in the appropriate OR BRANCH in the QO RSE tree that the data collection for the base relation is FULL.

Other access plans will be described as examples to explain the preferred implementation to the ordinary skilled artisan. From these examples, the access plans for other operations may be determined.

Figure 33:
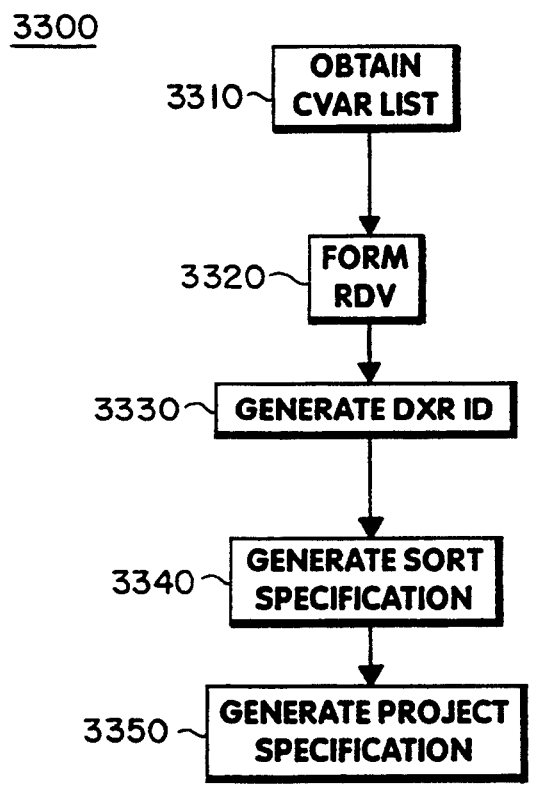
FIG. 33 is a flow diagram of a preferred procedure for generating an access plan for a PROJECT expression.

FIG. 33 shows a flow diagram 3300 for generating an access plan for the PROJECT expression. In DRSI, an RSE stream can be projected by a set of computed value expressions, so QO APG 334 must generate access plans to compute all of the value expressions from the data collection.

First the list of context variable used in the PROJECT expression is obtained (Step 3310). Next, a record data vector is formed to read data tuples from the data collections (Step 3320). DXR GEN 336 is then requested to generate a DXR ID to compute the project keys (Step 3330). Next, a sort specification generated (Step 3340). Finally, a project specification generated.

Figure 34:
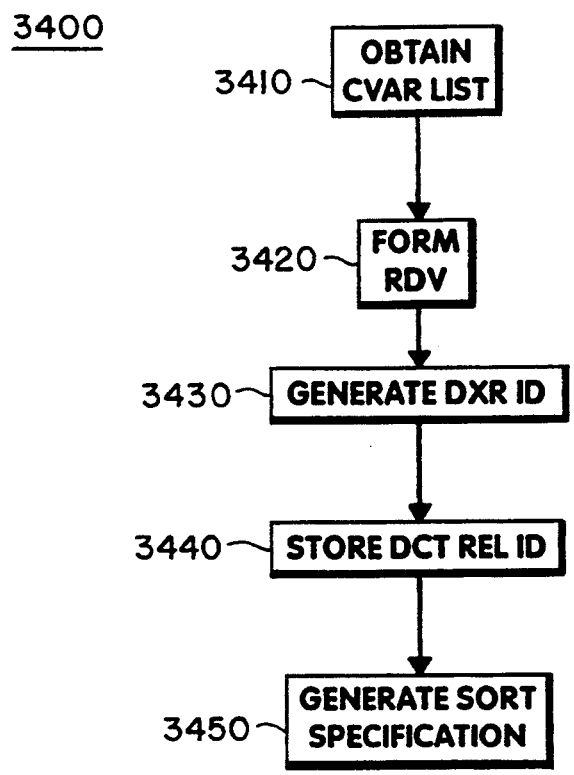
FIG. 34 is a flow diagram of a preferred procedure for generating an access plan for a SORT expression.

FIG. 34 contains a flow diagram 3400 for generating an access plan for a SORT expression. In DSRI, an RSE stream may be sorted by a set of computed value expressions, so QO APG 334 must generate an access plan to compute all the value expressions from the data collections.

First, a list of context variables used in the SORT expressions is obtained (Step 3410). Next, a record vector is formed to read the data tuples from the data collections (Step 3420). DXR GEN 336 is then requested to generate an DXR ID from computing the SORT keys (Step 3430).

The DCT Rel ID for the SORT key expressions in the access plan are then stored (Step 3440). Finally, the SORT specification is formed in the Access Plan (Step 3450).

c. DXR GEN

The functions of the DXR GEN 336 have already been described in part in the preceding discussion. For example, DXR GEN 336 executes the procedures indicated by the DXR IDs to evaluate expression.

DXR GEN 336 also generates the operation codes for the Access Plans in the preferred implementation. In this sense, DXR GEN 336 acts as a compiler.

4. Request Processing System

As explained above, request processing system 340 includes DCM 342, WSM 344, DXR EVL 346, and JE 348.

a. DCM

Figure 35:
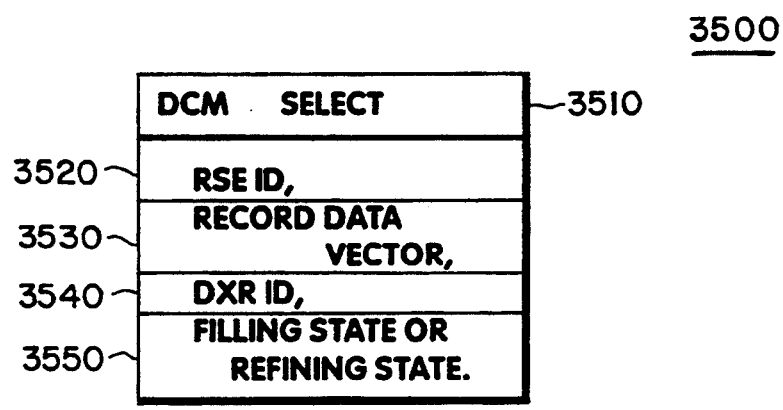
FIG. 35 is an example of a DCM SELECT specification block.

DCM 342 executes selects from QO 330 which are not sent directly to a data driver. This is done in the preferred implementation by the DCM SELECT specification. FIG. 35 shows an example of a DCM SELECT specification 3500.

The DCM SELECT specification 3500 includes a header 3510, an RSE ID field 3520, a Record Data Vector 3530, a DXR ID 3540, and a State flag 3550.

Header 3510 includes two subfields. One is an identification of the block type, which identifies the DCM SELECT specification 3500 as a DCM SELECT access plan block. The other is preferably a pointer for the next Access Plan block. This allows formation of the Access Plan as a linked list.

RSE ID field 3520 indicates the selection to be applied by DCM 342 on the data collection established for the RSE specified by this field.

Record Data Vector 3530 identifies the address of a corresponding record data vector for the DCM SELECT specification.

DXR ID 3540 is an ID used by DXR GEN 336 for evaluating the selection on the data collections.

State flag 3550 indicates whether a selection is being performed for a Filling State or a Refining State.

The DCM 342 thus obtains data for QO APG 334 which cannot be obtained solely by the data drivers due to limitations in those data drivers.

In obtaining that data, DCM 342 makes use of WSM 344.

b. WSM

WSM 344 is used to generate the work space needed by DCM 342 and by Request Processing System 340. The work space is used to control storage of data collections in memory so that virtual address space is not exceeded. WSM 344 uses conventional techniques to allocate the needed work space.

c. DXR EVL

DXR EVL 346 is used to perform the mathematical operations needed by DCM 342. In this way, DXR EVL 346 performs many of the same mathematical and Boolean functions for DCM 342 that DXR GEN 336 performs for QO APG 344.

d. JE

JE 348 is used by DCM 342 to perform join operations. Examples of the use of join operations can be seen from the functions that are performed for nesting operators. Certain nesting value expressions, such as VIA, FROM, MAP, STATISTICAL VALUES, and GROUP BY, require temporary data relations to be formed.

For example, in the case of VIA and FROM, a new value is computed for every tuple in the outer RSE, which is stored in the data collection along with other outer RSE data tuples. For the nesting value expressions, DRT 320 transforms an input RSE to be evaluated on the temporary relation data, and QO APG 334 assigns the context variable for the temporary relation. DXR GEN 346 generates the metadata information for the temporary relation.

The nesting operators in the preferred embodiments are processed by JE 348. For example, for the VIA operation, JE 348 determines a result value of processing VIA between two RSEs and propagates the result value to a SUBQUERY collections of outer RSEs. Thus, when VIA is processed, a data collection is added to the SUBQUERY collections of the outer RSE.

Figure 36:
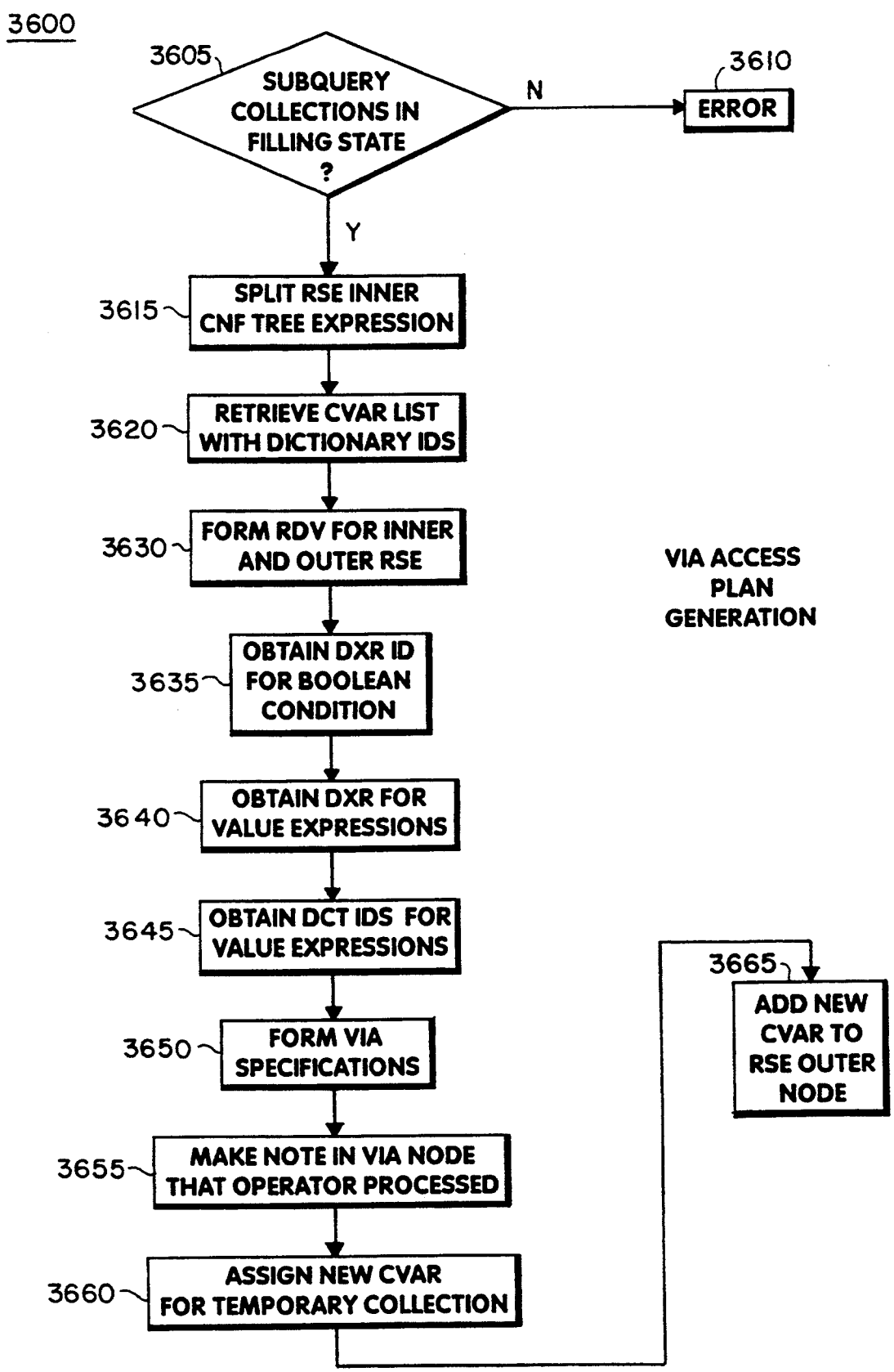
FIG. 36 is a flow diagram of a preferred procedure for generating a VIA access plan.

FIG. 36 includes a flow diagram 3600 with a preferred procedure for generating a VIA access plan. In flow diagram 3600, an initial check is made to see whether the RSE Inner SUBQUERY collections are in the Filling State (Step 3605). If not, then an error is noted (Step 3610). Next, DRT 320 is requested to partition the RSE Inner CNF tree expression (Step 3615).

A list of context variables and dictionary IDs is retrieved (Step 3620). This list is used to form the record data vector which will have context variables from both the inner RSE and the outer RSE SUBQUERY collections. A separate record data vector is formed for the inner RSE and the outer RSE SUBQUERY collections (Step 3630).

A DXR ID is then obtained for the Boolean condition to be evaluated (Step 3635). Next, a DXR ID for the value expressions 1 and 2, to be computed from the RSE inner data tuples is obtained (Step 3640). The DCT IDs for the value expressions 1 and 2 are also obtained (Step 3645).

The VIA specifications for the Access Plan are then formed (Step 3650). A note is then made in the VIA node in the QO RSE tree that the nesting operator has been processed (Step 3655).

A new context variable is then assigned for the temporary data collection (Step 3660). A new context variable node is then added as a child to the RSE outer node in the QO RSE tree (Step 3665).

JE 348 performs similar operations for other nesting operators such as FROM. For the ANY nesting operator, JE 348 determines whether there is at least one tuple in the inner RSE data collection for each tuple in the outer RSE data collection, and performs the same function for the UNIQUE operator. For the STATISTICAL VALUES nesting operator, JE 348 computes all the statistical values from the outer RSE data collections. JE 348 determines the results value of processing these statistical value operations between two RSEs and propagates the result value to the set of outer RSE data collections.

C. Dictionary and Drivers

1. Dictionary

In the relational data access facility of this invention, dictionaries serve as repositories for metadata. A single dictionary can provide metadata definitions for many non-relational files. Although the following description of dictionaries will focus on dictionaries built using the CDD/Plus facility, the present invention is not limited to the use of such dictionaries.

The CDD/Plus facility is used to define metadata for the data being placed in the non-relational data file. The metadata describes the data and describes how that data is used. That metadata includes location, type, format, size, and usage of the actual data. In this sense, the data in the non-relational file is defined by the combination of the data plus the metadata.

For users that have already defined their data in a non-relational file, for example, RMS users who have created CDD/Plus definitions for RMS files, such definitions can be used with the relational data access facility of this invention. Those definitions need only one additional attribute which is the data used to access the file.

If there is no CDD/Plus data dictionary already constructed, then a Common Dictionary Operator (CDO) utility may be used to construct a dictionary.

Preferably, each dictionary definition contains a name that uniquely identifies it. That definition name preferably contains the dictionary origin, which is the root of the dictionary, and the path, which consists of a list of dictionary directory names reflecting root dictionary hierarchy.

FIG. 37 shows displays of metadata in a dictionary created using the CDO facility. Section 3710 includes a list of the metadata elements and their identification. Some of the elements are fields, some are records or relations, and some are databases. The dictionary could also contain views, although none are shown.

Section 3720 shows the composition of a record Job_History_Record along with the fields which it contains. Section 3730 shows the composition of a database with the records (relations) and fields which it contains.

As indicated above, metadata functions apply to the three different types of objects used in relational data access facility 300: views, relations and fields. All of the operations of the relational data access facility described above operate on one of these types of objects. A view includes one or more relation definitions (base relations), the set of fields drawn from the base relations, and a query defining which data to be selected for the view. Each view, and its constituent relations and fields, must be defined in a single dictionary.

A relation is an aggregate of fields from a single data source and must be defined in a single metadata source. A field is a data item, or alternatively the basic unit of data. A field definition must be contained in the same dictionary as a relation definition.

Figure 38:
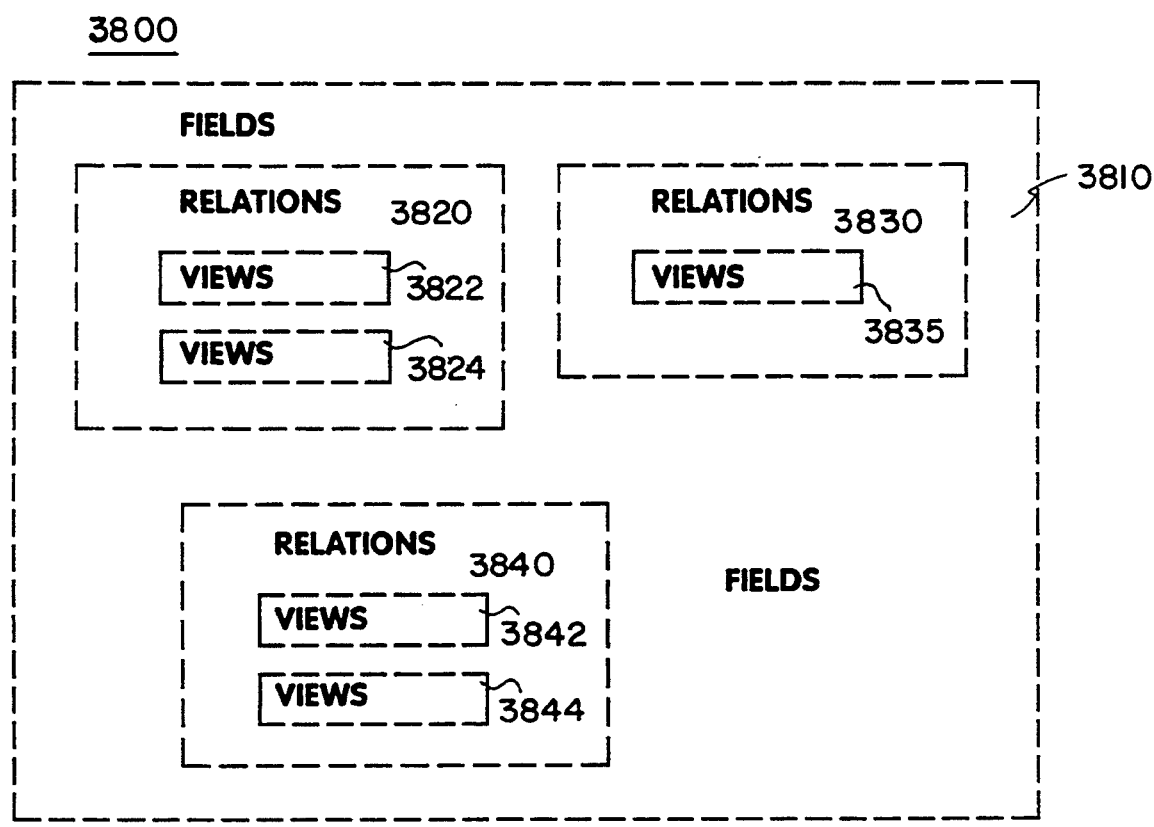
FIG. 38 is a conceptual diagram showing the relationship of different objects used in the relational data access facility of this invention.

FIG. 38 shows an inverted hierarchy to explain the relationships of the objects in the present invention. The dictionary has several fields 3810. Some of the fields are part of relations 3820, 3830, 3840. Some of the relations are part of views, 3822, 3824, 3842, and 3844. The same field can be in more than two relations, and some relations can be in more than one view, even though FIG. 38 does not show such a construction.

The preferred implementation of a dictionary according to this invention requires certain attributes for each object. For a field object, the dictionary must contain the field name, the data type, the scale (to indicate an order of magnitude for the data), the data length, a query name, a query header, a "based on name" (to identify the name of another field on which the present field is based), and a description field (commentary to describe the field). Optional attributes are an edit string attribute for display formatting of a field, and a "computed by" expression attribute which defines the value of a field according to an expression.

Relations must have their name, the data driver name, the data location name, a relation field attribute naming the fields that make up the relation, a Dbkey length field identifying the length of the dbkeys supplied by the data driver, and a context variable attribute which identifies the context variable of the relation when the relation takes part in the view. The relation should also have a description attribute for allowing commentary describing the relation.

The view entity must have a name, an RSE identifier which defines the composition of the view, the names of the relations in the view, the names of fields in the view, and a description attribute for allowing commentary to describe the view.

2. Dictionary Driver

The dictionary or metadata drivers retrieve data definitions from the dictionary. The drivers are in essence a collection of functions. They provide a single entry point into the dictionary in the preferred implementation. In the preferred implementation, the metadata driver must support the dictionary attributes identified above.

The metadata drivers are specified using a "DECLARE SCHEMA" command to identify the metadata driver for a particular non-relational data file. If no dictionary driver is identified, the default is to the CDD/Plus in the preferred implementation.

In the preferred implementation, the dictionary drivers return to NSDS 305 a function vector which indicates the functions the corresponding drivers support. The function vector also preferably indicates the names of the functions and address pointers. NSDS 305 uses the function vectors to invoke the functions directly. FIG. 39 includes a function vector 3900 listing the required dictionary driver functions 3910 and their associated addresses 3920.

The ATTACH DICTIONARY function establishes a connection between NSDS 305 and a dictionary driver in order to retrieve metadata from the dictionary. This function must be called before any other dictionary function. The DETACH DICTIONARY function disconnects an established connection between NSDS 305 and the dictionary driver. This disconnection also releases all resources used in accessing a corresponding data dictionary.

The INITIALIZE function requests a dictionary driver to return to NSDS 305 the function vector which identifies the functions in the vector as well as the addresses. The function vector is also used to identify to NSDS 305 which functions the dictionary driver have implemented.

The FETCH DICTIONARY FIELDS function requests a dictionary driver to fetch from a given attached dictionary the definition of every field defined in that dictionary. In response to a call to FETCH DICTIONARY FIELDS function, metadata is returned one field at a time using the FIELD CALLBACK function described below. The FETCH DICTIONARY RELATIONS functions and the FETCH DICTIONARY VIEWS FUNCTION operable similarly for relations and views, respectively.

The FETCH FIELD function requests a dictionary driver to fetch from an attached dictionary a specific field as well as its field-specific attributes. The FETCH RELATION function and the FETCH RELATION FIELDS function operates similarly for relations and fields respectively. The relations may be view relations or base relations.

The FETCH VIEW function requests a dictionary driver to fetch a view and its view-specific attributes from an attached dictionary. Views may not be function relations in the preferred implementation. The FETCH VIEW FIELDS function and the FETCH VIEW RELATIONS function operate similarly for fields and relations, respectively, of a view.

The FIELD CALLBACK function is used by to communicate field metadata back to NSDS 305. The RELATION CALLBACK function and VIEW CALLBACK function operate similarly for relations and views, respectively.

Second, because the dictionary driver has a common interface with the NSDS, that interface being defined by the functions which the dictionary driver must support, existing dictionary drivers may be easily adapted for use with the present invention. All that is required is to implement the required functions, and any optional functions. In this way, new dictionaries can be easily added to the relational data access facility of this invention.

D. Data Driver

The data drivers provide intelligent interfaces to the non-relational data files. The intelligence in the interface involves knowledge of how to use the particular data file as well as the knowledge of the particular data objects being operated upon. Much of this intelligence is provided by the set of metadata that is provided for each data access. For each request, the data driver receives formatted metadata for the data to be accessed. For example, the data drivers may receive the columns or fields and the attributes for those columns or fields.

Each of the data drivers can support more than one data file is the preferred implementation. NSDS 305 can also support several different data drivers.

Each of the tuples or data records in a data relation or file must be uniquely identified by a database key or dbkey. As explained above, dbkey could be a primary key of the tuple or the record, or it could be a unique index key, such as the record address on a disk. The dbkey must be valid for the period that the relation or data file is open, and must reliably identify one and only one data instance from the data source.

Similar to the dictionary drivers, the data drivers provide a function vector for use by NSDS 305. The data driver function vector gives the address within the driver of each of the functions, as well as the names of the functions. FIG. 40 shows an example of a function vector 4000.

In the preferred implementation, every function vector entry must have a value. The entry for an optional driver function may be null if the driver does not support that function.

The INITIALIZE INTERFACE function requests a data driver to return to NSDS 305 a function vector which identifies the data driver functions. The function addresses found in this function are used to call the driver functions needed.

NSDS 305 binds to a data driver by first loading the driver. In the preferred implementation, the data driver is an image which is activated by the relational data access facility.

The OPEN DATA RELATION function opens a non-relational data relation or file. This must be the initial function which is sent to the data driver.

An ALLOCATE METADATA MEMORY function causes the data driver to allocate memory for metadata. This must be the next function sent to the data driver. This function communicates the number of columns or fields in a given relation or file to the data driver. The driver then allocates memory for the field names, the data types, the scale, and field length. In addition, the data driver passes the pointers to all the character arrays using this function.

A RECEIVE METADATA INFORMATION function causes the data driver to receive the metadata information.

A SHOW RELATION INFORMATION function communicates storage information about an identified relation or file to NSDS 305.

A START TRANSACTION function will cause the data driver to start a transaction in the underlying file. A transaction must be started before any operations on the data. A transaction handle is assigned by the data driver and must be passed by NSDS 305 in all subsequent data access calls. Only one transaction may be active at any one time for each open data file or relation in the preferred implementation. After a START TRANSACTION function, however, several data access calls can be made.

The types of operations the transaction may perform depend upon the access mode with which the relational data file or relation is open. In the preferred implementation, the only allowable mode is a read-only mode.

The SET DATA SELECTION function establishes a set of qualifying data instances from an open data source. The data driver uses the SET DATA SELECTION function to communicate a DXR ID which selects the data needed. Any subsequent fetches from the data source obtain data from a qualifying set.

The SET ACCESS PATH function specifies an index or hash key to be used to access data. The function also passes information about the presence of any condition which may need to be evaluated, such as for comparison.

The FIND ALL DATA function searches the data source to find all the data instances which satisfy the current data selection. That selection must have been set by a prior SET DATA SELECTION function. The FIND ALL DATA function finds all the qualifying data instances and the data source.

If the RSE given on a prior set data selection function is null, then the FIND ALL DATA function will locate the data instances in the data source, invoking the DATA CALLBACK function for each qualified record. If no data instances satisfy a DXR ID, then a status value is returned indicating the end of data.

The GET ALL DATA function returns to NSDS 305, by means of the DATA CALLBACK function, the dbkeys and the data instance specified by a prior SET DATA SELECTION function. All of the data tuples or records returned must comply with the metadata definitions received by the data driver.

The GET DATA BY DBKEY function retrieves the data instance itself for the supplied dbkey. The dbkey must have been obtained prior to using this function by means of a GET ALL DATA function. The tuple or records retrieved are copied into the record buffer supplied as an argument. The data tuple or record returned by this function must comply with the metadata definition supplied to the data driver.

An ACCESS PATH CALLBACK function is not implemented as part of any data driver. Instead it exists as part of NSDS 305 and is used by a data driver. The ACCESS PATH CALLBACK function is called for each index or hash key in the identified file which the data driver can support.

The DATA CALLBACK function is also not implemented as part of any particular data driver but instead exists as a part of the NSDS 305 for use by a data driver. The callback functions contain buffers for returning the data or the dbkeys.

The CLOSE DATA RELATION function causes the data driver to close the data relation or file. The close data relation function detaches a relation or data file and releases all the resources allocated to that detached data file or relation. This is the final call after all operations are made on the data and affects a shutdown which aborts any incomplete transactions.

At the end of a transaction, either the COMMIT TRANSACTION or ROLLBACK TRANSACTION function must be invoked. The COMMIT TRANSACTION function commits a transaction in the underlying data source. Any further operations on the relation or the data file must start a new transaction. The ROLLBACK TRANSACTION function undoes all of the changes made to the relation or file by the transaction. In read-only environment, a ROLLBACK TRANSACTION function is identical to the COMMIT TRANSACTION function and may only be invoked after a transaction has begun.

The FREE METADATA MEMORY function causes the data driver to release the memory for the metadata. The FREE METADATA MEMORY function tells the data driver that it may no longer allocate the memory for the corresponding metadata.

All of these functions except the ROLLBACK TRANSACTION function are required in the preferred implementation.

Because the data drivers, like the dictionary drivers, pass a function vector to NSDS 305, the relational data access facility of this invention can adapt easily to the functionality provided by the different data drivers. For example, QO APG 334 will generate a DCM SELECT specification instead of a DRIVER SELECT specification.

In addition, the NSD8 presents a common interface to all of the data drivers. That interface is defined by the functions listed above. Thus, existing data drivers can be easily adapted for use with the relational data access facility of this invention merely by adding an interface which provides the functions identified above.

The present invention also supports the use of a data transfer facility DTP 212 (FIG. 2) which provides a record level access to VSAM access facilities. DTF 212 provides transparent access to the data sets in VSAM. The VSAM data may be combined with CDD/Plus data definition to provide emulated relational access. Such access can be provided easily in the preferred implementation of the present invention by defining the location of the data in the database using a logical name that points to a file or specification that references DTF 212 and includes a valid VSAM file.

V. SUMMARY

The relational data access facility of this invention provides the desired features indicated above. The relational data access facility of this invention allows an easy mechanism for non-relational data files to be accessed by relational queries. The interface provided to the non-relational data files by way of the data drivers can be a common interface which can be added to existing drivers. Similarly, a common interface is provided to the dictionary drivers to facilitate defining metadata.

The data drivers themselves, by means of the function vector in the preferred implementation, and generally by means of the other features of the invention, allow for the relational data access facility to adapt its functionality and its power to the power of the data driver. The more functions that are implemented by the data driver, the fewer which need to be implemented by the relational data access facility of this invention.

Furthermore, the query optimizer of this facility minimizes cost and increases efficiency of the data accesses by examining the queries to determine a preferred order of data access.

Persons of ordinary skill in the art will recognize that various modifications and variations may be made in this invention without departing from the spirit and scope of the general inventive concept. This invention in its broader aspects is therefore not limited to the specific details or representative methods shown and described.

What is claimed is:

1. A method for providing relational access to data stored in non-relational data files in response to queries for accessing a relational database, the relational database of the type composed of tables comprising the steps, executed by a data processor, of:
   maintaining metadata corresponding to each of the non-relational data files, the metadata defining the data organization in a corresponding non-relational data file;
   accessing the metadata from the dictionary means; decoding the queries, according to the metadata, into a subset of data access commands, the subset of data access commands selected from a set of data access commands common to the non-relational files; and
   accessing the data in the non-relational data files specified by each of the subset of data access commands received from the data engine means according to the metadata.

2. The method of claim 1 further including the step of communicating with a dictionary driver to obtain information regarding the metadata for decoding the queries into the subset of data access commands.

3. The method of claim 1 further including the steps of ensuring the correctness of the queries; and
   forming Boolean expressions from the queries.

4. The method of claim 1 further including the step of placing the subset of data access commands into a sequence which expedites the access of the desired data.

5. The method of claim 4 wherein the step of placing the subset of data access commands into a sequence which expedites the access of data includes the substep of
   organizing the Boolean expressions into a tree structure.

6. The method of claim 5 wherein the step of placing the subset of data access commands into a sequence which expedites the access of data includes the substep of
   traversing the tree structure to form an access plan containing the subset of data access commands to access the desired data.

7. The method of claim 6 wherein the step of placing the subset of data access commands into a sequence which expedites the access of data includes the substep of
   examining the amount of system resources used by different sequences of the subset of data access commands.

8. The method of claim 6 wherein the step of placing the subset of data access commands into a sequence which expedites the access of data includes the substep of
   executing the subset of data access commands in the access plan.

9. A system for providing relational access to data stored in non-relational data files in response to queries for accessing a relational database, the relational database of the type composed of relationship tables, comprising:
   dictionary means for maintaining metadata corresponding to each of the non-relational data files, the metadata defining a data organization in a corresponding non-relational data files;
   data engine means, coupled to the dictionary means and isolated from the physical structure of the non-relational data files, for accessing the metadata from the dictionary means and for decoding the queries, according to the metadata, into a subset of data access commands, the subset of data access commands selected from a set of data access commands common to the non-relational data files; and
   data driver means, coupled to the data engine means, for accessing the data in the non-relational data file specified by the subset of data access commands received from the data engine means according to the metadata.

10. The system of claim 9 wherein the dictionary means includes
    field means for storing field definitions for each of the non-relational data files, the field definitions specifying the basic units of data as fields in the corresponding non-relational data file.

11. The system of claim 10 wherein the dictionary means includes
    relation means for storing relation definitions for each of the non-relational data files, the relation definitions specifying compositions of fields as relations in the corresponding non-relational data file.

12. The system of claim 11 wherein the dictionary means includes
    view means for storing view definitions for each of the non-relational data files, the view definitions specifying compositions of relations as views in the corresponding non-relational data file.

13. The system of claim 9 wherein the dictionary means includes
    a dictionary containing metadata for at least one of the non-relational data files, and
    a dictionary driver associated with the dictionary and used for accessing the metadata in the dictionary.

14. The system of claim 13 wherein the dictionary driver includes
   a dictionary function vector defining metadata access functions supported by the dictionary driver, and wherein the data engine means includes
   dictionary function vector means for communicating with the dictionary driver to obtain information regarding the metadata for decoding the queries into the subset of data access commands.

15. The system of claim 9 wherein the data engine means includes
   parser means for ensuring the correctness of the relational-type queries and for forming Boolean expressions from the relational-type queries.

16. The system of claim 9 wherein the data engine means includes
   optimizing means for placing the subset of commands into a sequence which expedites the access of the desired data.

17. The system of claim 16 wherein the optimizing means includes
   means for organizing the Boolean expressions into a tree structure.

18. The system of claim 16 wherein the optimizing means includes
   means for traversing the tree structure to form an access plan containing the sequence of commands to access the desired data.

19. The system of claim 18 wherein the optimizing means includes
   means for examining the amount of system resources used by different sequences of commands.

20. The system of claim 16 wherein the data engine means includes
   request processing means for executing the commands in the access plan.

21. The system of claim 20 wherein data driver means includes
   a data driver function vector defining data access functions supported by the data driver means, and wherein the request processing means includes
   function vector means for communicating with the data driver means to obtain information regarding the supported data access functions.

22. The system of claim 21 wherein the request processing means includes means, coupled to the function vector means, for executing the subset of data access commands in the access plan based on the information obtained regarding the metadata for decoding the queries into the supported data access commands.

23. The system of claim 21 wherein the function vector means includes
   means for receiving from the data driver means a function vector identifying each of the data access functions supported by the data driver means and a corresponding address for invoking each of the supported data access functions, and wherein the request processing means includes
   means for causing the data driver means to invoke the functions supported by the data driver means by transferring control to the corresponding addresses in the function vector.

24. The system of claim 9 wherein the data driver means includes
   means for sending a function vector to the data engine means, the function vector identifying the data access functions supported by the data driver means and a corresponding address for invoking the supported functions.

25. The system of claim 9 wherein the non-relational data files have file types, and wherein the data driver means includes
   a plurality of drivers each corresponding to a different non-relational file type, and wherein the data engine means is coupled to each of the drivers.

* * * * *